United States Patent [19]
Kohler et al.

[11] Patent Number: 5,646,752
[45] Date of Patent: Jul. 8, 1997

[54] COLOR IMAGE PROCESSING APPARATUS WHICH USES PRIVATE TAGS TO ALTER A PREDEFINED COLOR TRANSFORMATION SEQUENCE OF A DEVICE PROFILE

[75] Inventors: Timothy L. Kohler, Mountain View; Jonathan Y. Hui, Fremont, both of Calif.

[73] Assignee: Canon Information Systems, Inc., Costa Mesa, Calif.

[21] Appl. No.: 529,111

[22] Filed: Sep. 15, 1995

[51] Int. Cl.$^6$ .................................................. H04N 1/40
[52] U.S. Cl. ............................................. 358/520; 358/527
[58] Field of Search .......................... 358/515–523, 358/504, 527; 382/162, 167; 348/223, 650, 655

[56] References Cited

U.S. PATENT DOCUMENTS 4,941,039  7/1990  E'Errico .................................. 358/80

*Primary Examiner*—Stephen Brinich
*Attorney, Agent, or Firm*—Fitzpatrick, Cella, Harper & Scinto

[57] ABSTRACT

An apparatus for converting input color image data between a device-dependent color space and a device-independent color space uses a device profile having public tags through which an unalterable series of color transformation operations can be accessed, and private tags through which an alternative series of color transformation operations can be accessed. The apparatus inputs the image data and stores a first private tag and a second private tag. The first private tag stores override information for overriding the unalterable series of color transformation operations, and the second private tag stores, in a hierarchical storage structure, tag element data and references to public tags and other private tags in the device profile. The apparatus determines, based on the override information in the first private tag, whether to access the second private tag, and reads data from the second private tag in a case that it is determined to access the second private tag. The apparatus includes pointers within the hierarchical storage structure to access the tag element data and the references to public tags and other private tags in the second tag. The apparatus performs color transformation operations on the color image data using the data read from the second tag.

34 Claims, 21 Drawing Sheets template.prf

Header:

size: 259354 bytes
CMMType: "UCCM"
version: 0x02000000
profileClass: "prtr"
dataColorSpace: "CMY"
interchangeSpace: "Lab"
CreationDate: 23.6.95, 16:51:8
CS2Signature: "acsp"

prim.platform: "MSFT"
flags: 0x00000000
deviceManufacturer: "CANO"
deviceModel: 1110716737
deviceAttributes: 0x00000204, 0x01000000
renderingIntent: 0
white XYZ: X = 0.9642, Y = 1.0000, Z = 0.8249

Tag Table: (19 elements, double-click to inspect)

| Ind | Signat. | elementOffset | size |
|---|---|---|---|
| 0 | 'meas' | 360 = 0x00000168 | 20 |
| 1 | 'cprt' | 380 = 0x0000017C | 82 |
| 2 | 'dmnd' | 462 = 0x000001CE | 115 |
| 3 | 'dmdd' | 577 = 0x00000241 | 123 |
| 4 | 'wtpt' | 700 = 0x000002BC | 20 |
| 5 | 'tech' | 720 = 0x000002D0 | 12 |
| 6 | 'desc' | 732 = 0x000002DC | 147 |
| 7 | 'pre0' | 879 = 0x0000036F | 109395 |
| 8 | 'pre1' | 879 = 0x0000036F | 109395 |
| 9 | 'pre2' | 879 = 0x0000036F | 109395 |
| 10 | 'gamt' | 110274 = 0x0001AEC2 | 37009 |
| 11 | 'B2A0' | 147283 = 0x00023F53 | 109395 |
| 12 | 'B2A1' | 147283 = 0x00023F53 | 109395 |
| 13 | 'B2A2' | 147283 = 0x00023F53 | 109395 |
| 14 | 'A2B0' | 147283 = 0x00023F53 | 109395 |
| 15 | 'A2B1' | 147283 = 0x00023F53 | 109395 |
| 16 | 'A2B2' | 147283 = 0x00023F53 | 109395 |
| 17 | 'ucml' | 256678 = 0x0003EAA6 | 240 |
| 18 | 'ucmP' | 256918 = 0x0003EB96 | 2436 |

FIG. 4

Private Information Tag

| | |
|---|---|
| uccms Private Information Tag Signature | 'ucml' |
| Canon Signature | 'CSIG' |
| Size of parameters in bytes | 244 |
| Engine version | 01000001 |
| Profile Format Document version | 01000001 |
| Profile version | 01000001 |
| Profile Build number | 01000001 |
| Interpolation flag | 01000001 |
| AtoB0Tag override | 0 |
| AtoB1Tag override | 0 |
| AtoB2Tag override | 0 |
| BtoA0Tag override | 0 |
| BtoA1Tag override | 0 |
| BtoA2Tag override | 33 |

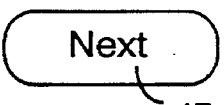 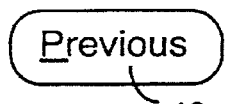 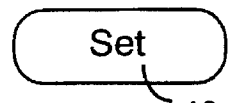 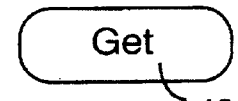

Next 47    Previous 48    Set 46    Get 42

Private Information Tag

| | |
|---|---|
| preview0Tag override | 0 |
| preview1Tag override | 0 |
| preview2Tag override | 0 |
| gamutTag override | 0 |
| AtoB0Tag Optimization Flag | 0 |
| AtoB1Tag Optimization Flag | 0 |
| AtoB2Tag Optimization Flag | 0 |
| BtoA0Tag Optimization Flag | 0 |
| BtoA1Tag Optimization Flag | 0 |
| BtoA2Tag Optimization Flag | 0 |
| preview0Tag Optimization Flag | 0 |
| preview1Tag Optimization Flag | 0 |
| preview2Tag Optimization Flag | 0 |
| gamutTag Optimization Flag | 0 |
| Creator Division | CIS |
| Support Division | CINC |
| Von Kries Flag | 0 |

Next  Previous  Set  Get
 47      48      46   42

| byte(s) | Description | Data | Data Type |
|---|---|---|---|
| 0-3 | uccmsPrivateInformationTag Signature | 'ucml' | icSignature |
| 4-7 | Canon Signature | 'CSIG' | uInt32 |
| 8-11 | Size of parameters in bytes | 244* | uInt32 |
| 12-15 | Engine version | 0x01000001* | uInt32 |
| 16-19 | Profile Format Document version | 0x01010000* | uInt32 |
| 20-23 | Profile version | 0x01000000* | uInt32 |
| 24-27 | Profile Build number | 0x00000001* | uInt32 |
| 28-31 | Interpolation flag | 0x00000001* | uInt32 |
| 32-35 | AtoB0Tag override | 0x0* | uInt32 |
| 36-39 | AtoB1Tag override | 0x0* | uInt32 |
| 40-43 | AtoB2Tag override | 0x0* | uInt32 |
| 44-47 | BtoA0Tag override | 0x0* | uInt32 |
| 48-51 | BtoA1Tag override | 0x0* | uInt32 |
| 52-55 | BtoA2Tag override | 0x33* | uInt32 |
| 56-59 | preview0Tag override | 0x0* | uInt32 |
| 60-63 | preview1Tag override | 0x0* | uInt32 |
| 64-67 | preview2Tag override | 0x0* | uInt32 |
| 68-71 | gamutTag override | 0x0* | uInt32 |
| 72-75 | AtoB0Tag Optimization Flag | 0x0* | uInt32 |
| 76-79 | AtoB1Tag Optimization Flag | 0x0* | uInt32 |
| 80-83 | AtoB2Tag Optimization Flag | 0x0* | uInt32 |
| 84-87 | BtoA0Tag Optimization Flag | 0x0* | uInt32 |
| 88-91 | BtoA1Tag Optimization Flag | 0x0* | uInt32 |
| 92-95 | BtoA2Tag Optimization Flag | 0x0* | uInt32 |
| 96-99 | preview0Tag Optimization Flag | 0x0* | uInt32 |
| 100-103 | preview1Tag Optimization Flag | 0x0* | uInt32 |
| 104-107 | preview2Tag Optimization Flag | 0x0* | uInt32 |
| 108-111 | gamutTag Optimization Flag | 0x0* | uInt32 |
| 112-175 | Creator Division | CIS* | char[64] |
| 176-239 | Support Division | CINC | char[64] |
| 240-243 | Von Kries Flag | 0x0* | uInt32 |
| ... | Possible fields in the future | | |

FIG. 8

| byte(s) | Description | Data | Data Type |
|---|---|---|---|
| 0-3 | uccmsPrivateSequencesTagTable Signature | 'ucmP' | icSignature |
| 4-7 | Canon Signature | 'CSIG' | uInt32 |
| 8-11 | Number of Sequences | 4* | uInt32 |
| 12-15 | reserved | 0x00 | uInt32 |
| 16-39 | Sequences Structure 1* | | uccmsSequenceStructure |
| 40-63 | Sequences Sturcture 2* | | uccmsSequenceStructure |
| 64-87 | Sequences Structure 3* | | uccmsSequenceStructure |
| 88-111 | Sequences Structure 4* | | uccmsSequenceStructure |

```
/*UCCMS Sequence Structure*/
typedef struct {
uInt32      33       CanonID;    /*UCCMS ID for sequence structure*/
uInt32      00       reserved;   /*always put 0 here*/
uInt32      04       numOpers;   /*number of operations in sequence*/
uInt32      LAB      seqPCS;     /*profile connection space of this sequence*/
uInt32      40       length;     /*length of operation tag in bytes*/
uInt32      5163     offset;     /*offset to operation tag*/
                                 /*from byte 0 in 'ucmP'*/
```

FIG. 12

```
/*UCCMS Operation Structure*/
typedef struct {
uInt32          oper;           /*UCCMS operation number*/
uInt32          subid;          /*UCCMS sub ID number*/
uInt32          length;         /*length of parameter list*/
                                /*in bytes*/
uInt32          tagFlag;        /*flag, if 0x00 use parm*/
uInt32          parm[icAny]     /*as data, else use tag*/
                                /*parameter list*/
```

FIG 13

| byte(s) | Description | Data | Data Type |
|---|---|---|---|
| 0-3 | Operation ID | 1 | uInt32 |
| 4-7 | Sub ID | 0x00 | uInt32 |
| 8-11 | Length of Parameter List in bytes | 44* | uInt32 |
| 12-15 | Tag Flag - Always use param data | 0x00000000 | uInt32 |
| 16- | Parameter Data - n dimension | 0x03* | uInt32 |
| | Parameter Data - m dimension | 0x03* | uInt32 |
| | Parameter Data - Matrix Element a1 | 1* | s15Fixed16 |
| | Parameter Data - Matrix Element a2 | 0* | s15Fixed16 |
| | Parameter Data - Matrix Element a3 | 0* | s15Fixed16 |
| | Parameter Data - Matrix Element b1 | 1* | s15Fixed16 |
| | Parameter Data - Matrix Element b2 | 0* | s15Fixed16 |
| | Parameter Data - Matrix Element b3 | 0* | s15Fixed16 |
| | Parameter Data - Matrix Element c1 | 0* | s15Fixed16 |
| | Parameter Data - Matrix Element c2 | 0* | s15Fixed16 |
| | Parameter Data - Matrix Element c3 | 1* | s15Fixed16 |

| byte(s) | Description | Data | Data Type |
|---|---|---|---|
| 0-3 | Operation ID | 2 | uInt32 |
| 4-7 | Sub ID | 0* | uInt32 |
| 8-11 | Length of Parameter List | 0 | uInt32 |
| 12-15 | Tag Flag | 'A2B2'* | uInt32 |

| byte(s) | Description | Data | Data Type |
|---|---|---|---|
| 0-3 | Operation ID | 2 | uInt32 |
| 4-7 | Sub ID | 0 | uInt32 |
| 8-11 | Length of Parameter List | 771* | uInt32 |
| 12-15 | Tag Flag | 0 | uInt32 |
| 16 | Parameter Data - dimension | 0x03* | uInt8 |
| 17 | Parameter Data - # of input bits | 0x08* | uInt8 |
| 18 | Parameter Data - # of output bits | 0x08* | uInt8 |
| 19- | Parameter Data - 1D table | 0xFF* | uInt8 |
|  | Parameter Data ... |  | ... |

| FIG. 15A |
|---|
| FIG. 15B |

FIG. 15

| byte(s) | Description | Data | Data Type |
|---|---|---|---|
| 0-3 | Operation ID | 3 | uInt32 |
| 4-7 | Sub ID | 0 | uInt32 |
| 8-11 | Length of Parameter List | 1 | uInt32 |
| 12-15 | Tag Flag | 0 | uInt32 |
| 16-19 | Table ID | 0x11* | uInt32 |

83 

FIG. 16

| byte(s) | Description | Data | Data Type |
|---|---|---|---|
| 0-3 | Operation ID | 4 | uInt32 |
| 4-7 | Sub ID | 2* | uInt32 |
| 8-11 | Length of Parameter List | 0* | uInt32 |
| 12-15 | Tag Flag | 0x00 | uInt32 |

84 

FIG. 17

| byte(s) | Description | Data | Data Type |
|---|---|---|---|
| 0-3 | Operation ID | 5 | uInt32 |
| 4-7 | Sub ID | 0 | uInt32 |
| 8-11 | Length of Parameter List | 6 | uInt32 |
| 12-15 | Tag Flag | 0x00 | uInt32 |
| 16- | Red printer color (m+y) hue angle | 20* | uInt32 |
|  | Green printer color (c+y) hue angle | 175* | uInt32 |
|  | Blue printer color hue (m+c) angle | 300* | uInt32 |

88 

FIG. 18

| byte(s) | Description | Data | Data Type |
|---|---|---|---|
| 0-3 | Operation ID | 6 | uInt32 |
| 4-7 | Sub ID | 0* | uInt32 |
| 8-11 | Length of Parameter List | 0 | uInt32 |
| 12-15 | Tag Flag | 'A2B2'* | uInt32 |

| byte(s) | Description | Data | Data Type |
|---|---|---|---|
| 0-3 | Operation ID | 6 | uInt32 |
| 4-7 | Sub ID | 0 | uInt32 |
| 8-11 | Length of Parameter List | 771* | uInt32 |
| 12-15 | Tag Flag | 0 | uInt32 |
| 16 | Parameter Data - dimension | 0x03* | uInt8 |
| 17 | Parameter Data - # of input bits | 0x08* | uInt8 |
| 18 | Parameter Data - # of output bits | 0x08* | uInt8 |
| 19- | Parameter Data - 1D table | 0xFF* | uInt8 |
|  | Parameter Data ... | ... | ... |

| FIG. 19A |
|---|
| FIG. 19B |

FIG. 19

| byte(s) | Description | Data | Data Type |
|---|---|---|---|
| 0-3 | Operation ID | 7 | uInt32 |
| 4-7 | Sub ID | 0 | uInt32 |
| 8-11 | Length of Parameter List | 1 | uInt32 |
| 12-15 | Tag Flag | 0 | uInt32 |
| 16 | Parameter Data - | 0x08* | uInt8 |
| 17 | Parameter Data - | 0x08* | uInt8 |
| 18 | Parameter Data - | 0x08* | uInt8 |
| 19- | Parameter Data - | 0x08* | uInt8 |
|  | Parameter Data ... | ... | ... |

| byte(s) | Description | Data | Data Type |
|---|---|---|---|
| 0-3 | Operation ID | 7 | uInt32 |
| 4-7 | Sub ID | 0 | uInt32 |
| 8-11 | Length of Parameter List | 1 | uInt32 |
| 12-15 | Tag Flag | 0 | uInt32 |
| 16-19 | Table ID | 0x04* | uInt32 |

| byte(s) | Description | Data | Data Type |
|---|---|---|---|
| 0-3 | uccmsPrivateInterpolation TableTag Signature | 'ucmT' | icSignature |
| 4-7 | Canon Signature | 'CSIG' | uInt32 |
| 8-11 | Number of Tables | 3* | uInt32 |
| 12-15 | Reserved | 0 | uInt32 |
| 16- | Table 1 | | uccmsIntrpLUTType |
| | Table 2 | | uccmsIntrpLUTType |
| | Table 3 | | uccmsIntrpLUTType |

```
/*UCCMS Interpolation Table Header Structure*/
typedef struct {
    uInt32      tableID'       /*ID number of table*/
    uInt32      length;        /*length of table in bytes*/
    uInt32      offset;        /*offset to table from*/
                               /*byte 0 of ucmT*/
```

FIG. 23

| Byte(s) | Description | Data | Type |
|---------|-------------|------|------|
| 0-3 | tableKind | 0* | uInt32 |
| 4-7 | parentTag | 0x00* | icSignature |
| 8 | inChannels | 0x03* | uInt8 |
| 9 | inBits | 0x08* | uInt8 |
| 10 | outChannels | 0x04* | uInt8 |
| 11 | outBits | 0x08* | uInt8 |
| 12 | gridPoints3DTable | 0x21* | uInt8 |
| 13 | gridPoints4DTable | 0x21* | uInt8 |
| 14-15 | reserved | 0x00 | uInt16 |
| 16- | CLUT | | |

COLOR IMAGE PROCESSING APPARATUS WHICH USES PRIVATE TAGS TO ALTER A PREDEFINED COLOR TRANSFORMATION SEQUENCE OF A DEVICE PROFILE

BACKGROUND OF THE INVENTION

1. Field Of The Invention

The present invention is a system for modifying a profile format, such as an International Color Consortium (ICC) profile format, by storing, in a private tag, an order of color transformation operations and pointers to color transformation operations in the profile format, both of which take precedence over other color transformation operations defined in the profile format.

2. Description Of The Related Art

Profile formats are used to translate color image data formatted for one device color space into color image data formatted for another device color space or a device-independent color space. For example, an ICC profile format defines a series of standard color transformation operations to convert color image data formatted for an RGB (red, green and blue) color space in a color monitor into a device-independent color space, called the "profile connection space", and then into color image data formatted for a CMY (cyan, magenta and yellow) color space in a color printer.

While standardized ICC profiles achieve color compatibility between different devices in some cases, standardized ICC profiles are inflexible with respect to the numbers and types of color transformations operations which they perform and with respect to the order in which the color transformations are performed.

More specifically, ICC profiles define color transformation operations in public tags. In general, a tag is a area of memory which stores formatted data used for performing color transformation operations, and/or pointers to other tags. Public tags, as defined by the ICC, comprise tags which contain standardized color transformation operations which perform a predetermined set of color transformations in a predetermined order. ICC public tags are not alterable.

In this regard, because ICC public tags are limited to ICC-defined color transformation operations, they are unable to perform certain color transformation operations, particularly those color transformation operations which are needed to convert between color spaces not covered by the ICC.

Additionally, because ICC public tags are not alterable, once a public tag is accessed to perform a color transformation, all of the pre-set color transformation operations stored in the public tag must be performed in the specified order. In some cases, this can result in errors in color transformation. In other cases, this is merely inefficient. For example, unnecessary color transformation operations may be performed on input image data, regardless of whether the color transformation operations are required.

Thus, there exists a need for a system of modifying ICC profile formats which permits a software developer to modify the type, number and order of color transformation operations stored in the ICC profile format.

SUMMARY OF THE INVENTION

The present invention addresses the foregoing need by providing a system for modifying standardized color transformation operations in an ICC profile format using private tags. According to the present invention, color transformation operations, in addition to standardized color transformation operations are stored and accessed via an ICC profile format. Advantageously, the present invention also permits random access of color transformation operations stored in public tags in the ICC profile format by using pointers in the private tags to access the color transformation operations.

Thus, according to one aspect, the present invention is a system (i.e, a method, an apparatus and computer-executable process steps) of performing a color transformation operation on input image data, the system using a first tag and a second tag to perform the color transformation operation in place of a predetermined series of color transformation operations stored in a public tag in a profile format. The system includes an inputting step for inputting color image data, a storing step for storing a first tag and a second tag, the first tag for storing override information for overriding the predetermined series of color transformations, and the second tag for storing color transformation operation data accessible via a hierarchical storage structure, and a determining step for determining, based on the override information in the first tag, whether to access the second tag. Also included in the system are a reading step for reading the color transformation operation data in the second tag in a case that the determining step determines to access the second tag, the reading step following pointers within the hierarchical storage structure to access the color transformation operation data in the second tag, and a processing step for performing a color transformation operation on the input image data in accordance with the color transformation operation data read in the reading step.

By virtue of the foregoing configuration, it is possible to convert color image data from a first device-dependent color space, such as monitor RGB color image data, into a device-independent color space using a customized color transformation process, while still taking advantage of the features provided in standard profile format. By using the foregoing system in two different devices, it is possible to convert data from a first color space of a first device to a device-independent color space, and then from the device-independent color space to a second color space of a second device.

Additionally, because the foregoing system stores color transformation operations and calls thereto hierarchically, the foregoing system provides color matching software with ready access to the customized color transformation operations.

According to another aspect, the present invention is a system for using tags to modify a standardized transformation in a profile format in which numeric information is stored for use by the standardized transformation, and in which the tags are hierarchically stored. The system includes an inputting step for inputting color image data, and a first storing step for storing first pointer data at predetermined locations in a first tag which is at a highest level in a hierarchy of tags, the first pointer data pointing to a color transformation sequence in a second tag, the second tag being at a second highest level in the hierarchy of tags. Also included in the system are a second storing step for storing the color transformation sequence in the second tag, the color transformation sequence including a second pointer for pointing to a color transformation operation stored in a third tag, the third tag being at a third highest level in the hierarchy of tags, and a third storing step for storing data for performing the color transformation operation in the third tag. A determining step determines whether to access the first tag based on information stored in the profile format, and a first reading step reads, in the case that the first tag is to be accessed, the first pointer information in the first tag and determines whether to access the color transformation sequence. A second reading step reads, in the case that the color transformation sequence is to be accessed, the second pointer in the color transformation sequence to determine whether to access the color transformation operation, and a third reading step reads, in the case that the color transformation operation is to be accessed, the data for performing the color transformation operation from the third tag. A performing step performs the color transformation operation in accordance with the data read in the third reading step to transform the input image data from one color space to another color space in place of the standardized transformation.

Advantageously, the foregoing aspect of the present invention permits a user selectively to create and modify a private tag which can be used to modify an overall color transformation operation performed by a profile format, and thereafter to perform the modified color transformation operation on color image data. In addition, the foregoing hierarchical storage structure facilitates access to color transformation operation data used in the creation and modification of the private tag.

According to still another aspect, the present invention is a system for modifying a predetermined profile format having alterable tags and a plurality of predefined color transformation sequences, and of performing color transformation operations on color image data in accordance with a modified profile format. The system includes an inputting step for inputting the color image data, override information and tag data, the tag data including color transformation sequences and color transformation operations, the color transformation sequences comprising a plurality of color transformation operations. A storing step stores the tag data in an alterable tag in the profile format according to a hierarchical storage structure, such that the color transformation sequences are at a higher level in the hierarchical storage structure than the color transformation operations, each color transformation sequence including at least one pointer to a color transformation operation. A processing step processes the input color image data in accordance with the tag data stored in the alterable tag in the case that the override information has a predetermined value. The processing step includes (1) accessing a color transformation sequence in the alterable tag defined by the override information, (2) accessing a color transformation operation defined by a pointer in the accessed color transformation sequence, and (3) processing the color image data in accordance with the accessed color transformation operation.

This brief summary has been provided so that the nature of the invention may be understood quickly. A more complete understanding of the invention can be obtained by reference to the following detailed description of the preferred embodiment in connection with the attached drawings.

BRIEF DESCRIPTION OF THE DRAWINGS

FIG. 4 shows an ICC profile.

FIG. 6 shows a screen which depicts private tag information.

FIG. 7 shows a screen which depicts private tag information.

FIG. 8 shows the ucmI private tag.

FIG. 11 shows the ucmP private tag.

FIG. 12 shows a sequence structure.

FIG. 13 shows a color transformation operation structure.

FIG. 14 shows an N×M matrix private tag.

FIG. 15, comprised of FIGS. 15A and 15B, shows examples of three one-dimensional look-up table private tags.

FIG. 16 shows a three-dimensional look-up table private tag.

FIG. 17 shows a colorspace private tag.

FIG. 18 shows a color warping private tag.

FIG. 19, comprised of FIGS. 19A and 19B, shows examples of business graphics look-up table private tags.

FIG. 20 shows a first embodiment of a tri-linear interpolation or pyramidal interpolation private tag.

FIG. 21 shows a second embodiment of a tri-linear interpolation or pyramidal interpolation private tag.

FIG. 22 shows a ucmT private tag.

FIG. 23 shows a table structure.

FIG. 24 shows a table private tag.

DETAILED DESCRIPTION OF THE PREFERRED EMBODIMENT

Figure 1:
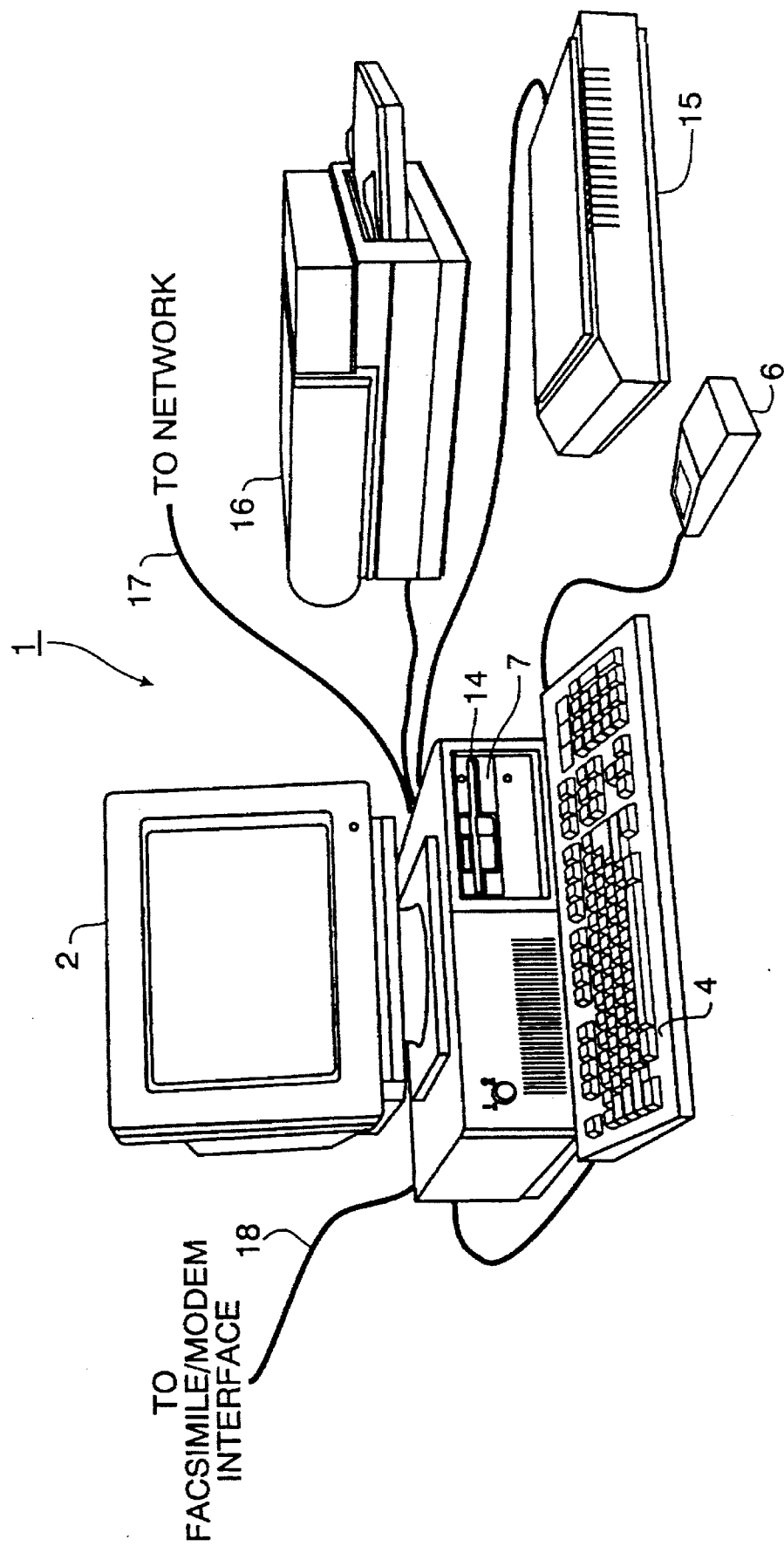
FIG. 1 shows a perspective view of computer hardware used in an operation of the present invention.

FIG. 1 is a view showing the outward appearance of a representative embodiment of the present invention. Shown in FIG. 1 is computing equipment 1, such as a Macintosh or an IBM PC-compatible computer having a windowing environment, such as Microsoft® Windows. Provided with computing equipment 1 is display screen 2, such as a color monitor, keyboard 4 for entering text data and programmer commands, pointing device 6, such as a mouse, for pointing and for manipulating objects displayed on display screen 2, and printer 16 for outputting color images generated by computing equipment 1.

Figure 2:
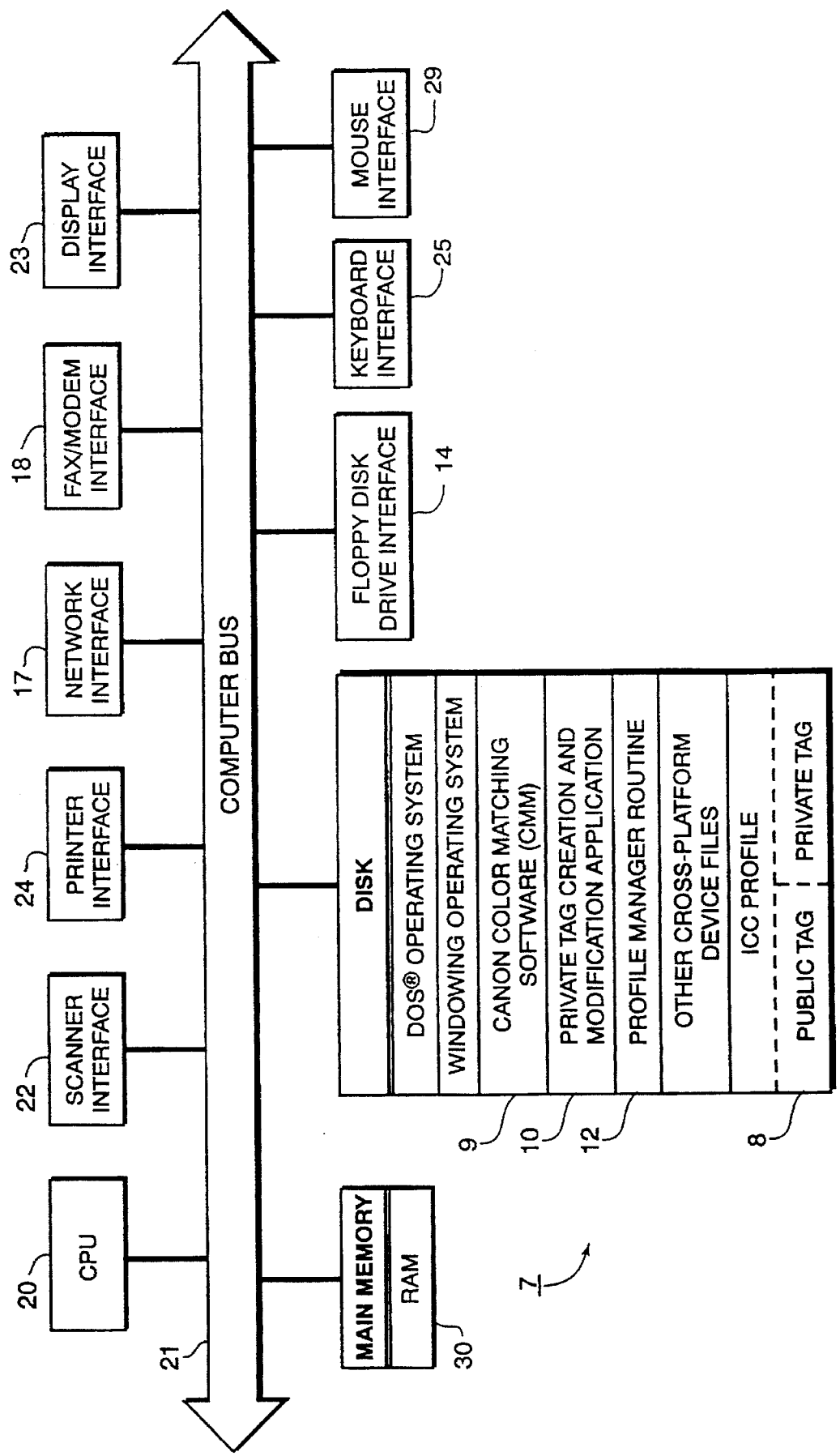
FIG. 2 shows a block diagram of the present invention.

Computing equipment 1 includes a mass storage device such as computer disk 7, also shown in FIG. 2, for storing profile formats such as ICC profile 8 which includes public tags and private tags, DOS® operating system, and a windowing operating system, such as Microsoft Windows®. Also stored in computer disk 7 are Canone color matching software (hereinafter "CMM") 9, private tag creation and modification application program 10, and profile manager routine 12, all of which contain stored program instructions by which computing equipment 1 manipulates and stores data files on disk 7 and presents data in those files to an operator via display screen 2. These programs are described in more detail below.

Computing equipment 1 also includes floppy disk drive interface 14, into which floppy disks can be inserted. Information from such floppy disks can be downloaded to computer disk 7. Such information can include data files and application programs, such as CMM 9, private tag creation and modification application program 10, and profile manager routine 12. Computing equipment 1 can also include a CD-ROM interface (not shown), from which information can also be downloaded to disk 7.

Color image data is input by scanner 15 which scans documents or other images and provides bit map images of those documents to computing equipment 1. Color image data may also be input into computing equipment 1 from a variety of other sources such as network interface 17 or from other external devices via facsimile/modem interface 18.

Additionally, it should be noted that ICC profile 8 can also be accessed by computing equipment 1 from a variety of other sources such as network interface 17 or from other external devices via facsimile/modem interface 18.

It should be understood that, although a programmable general-purpose computer arrangement is shown in FIG. 1, a dedicated or stand-alone computer or other type of data processing equipment can be used in the practice of the present invention.

FIG. 2 is a detailed block diagram showing the internal construction of computing equipment 1. As shown in FIG. 2, computing equipment 1 includes a central processing unit (hereinafter "CPU") 20 interfaced with computer bus 21. Also interfaced with computer bus 21 is scanner interface 22, network interface 17, fax/modem interface 18, display interface 23, keyboard interface 25, mouse interface 29, main memory 30, disk 7, floppy disk drive interface 14, and printer interface 24.

Main memory 30 interfaces with computer bus 21 so as to provide random access memory storage for use by CPU 20 when executing stored program instructions such as Microsoft Windows®, CMM 9, private tag creation and modification application program 10, profile manager routine 12, and other application programs (not shown). More specifically, CPU 20 loads those programs from disk 7, or alternatively, from a floppy disk in floppy disk drive interface 14, into main memory 30 and executes those stored programs out of main memory 30.

The present invention will be described with respect to a color image processing system which includes CMM 9. In brief, CMM 9 inputs color image data in a first color format, such as RGB and converts the color image data into a second format, such as CMY. To perform the foregoing color transformation operations, CMM 9 uses data stored in ICC profiles, which are described in "International Color Consortium Profile Format", version 3.01, (revised May 8, 1995), the contents of which are hereby incorporated by reference into the subject application.

Briefly, ICC profiles are device profiles which can be used in pairs to translate color data created on one device into a native color space of another device. For example, as described above, RGB color image data for a monitor can be converted into CMY image data for a printer using ICC profiles.

An ICC profile provides CMM 9 with color transformation information for a particular device. More specifically, an ICC profile is provided for each device and is used by CMM 9 to transform color image data from a device-dependent color space to the profile connection space, and to transform color image data from the profile connection space to another device-dependent color space. This relationship is illustrated in FIG. 3.

Figure 3:
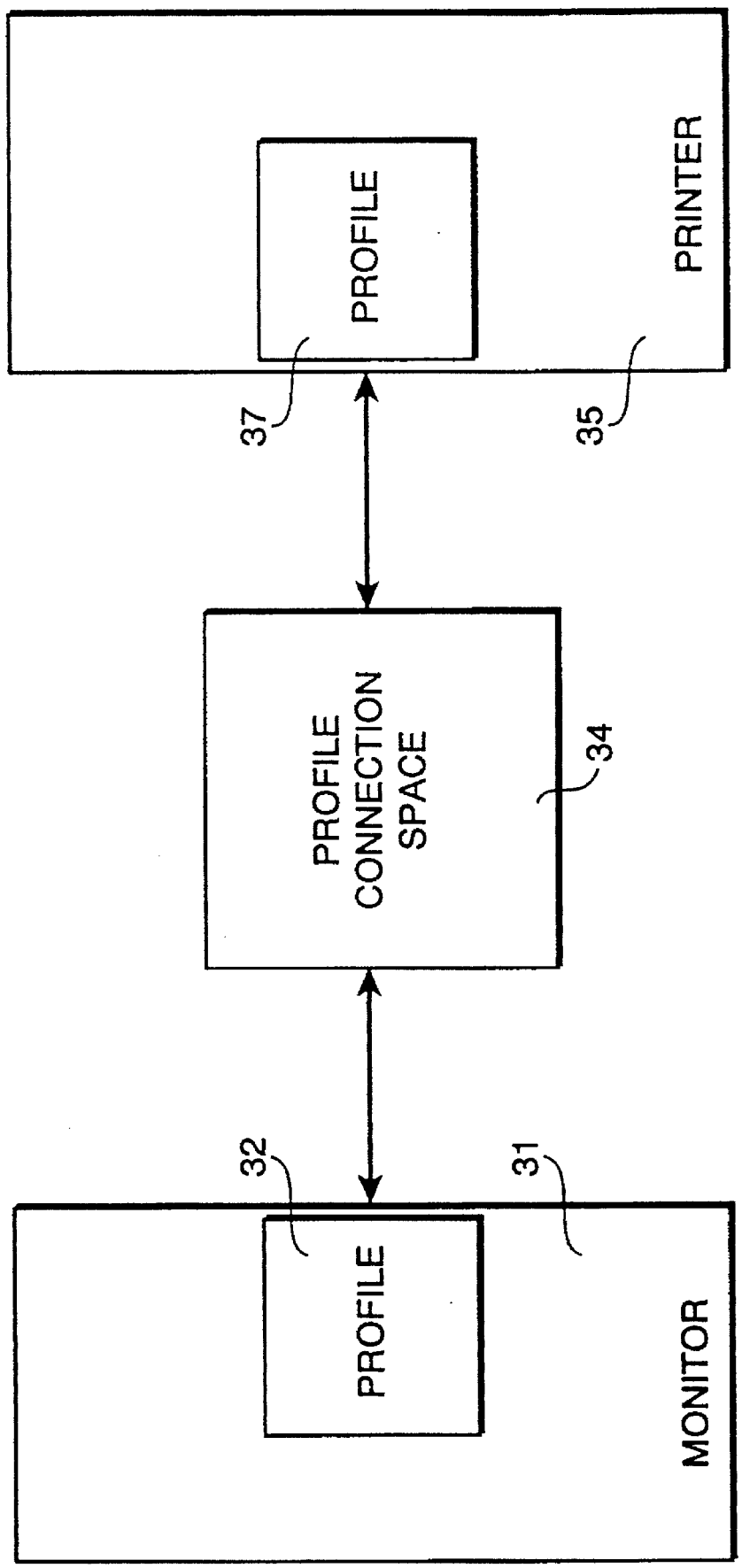
FIG. 3 shows the relationship between device-dependent color spaces and the profile connection space.

More specifically, FIG. 3 shows monitor 31 having ICC profile 32 which is used to transform RGB image data in monitor 31 to device-independent image data in profile connection space 34. Printer 35 includes ICC profile 37 which converts the color image data from the device-independent profile connection space to CMY image data, which can be used by printer 35. In this manner, CMM 9 uses the ICC profiles to convert between two device-dependent color spaces. It should be noted that while FIG. 3 shows ICC profiles 32 and 37 with respect to monitor 31 and printer 35, respectively, these ICC profiles are not resident on their respective devices. These ICC profiles may be embedded in data to be converted in accordance with the ICC profile or be stored in a memory in a connected personal computer. For example, the ICC profiles could be stored in a single memory, accessible by a single CPU.

Additionally, it is noted that ICC profiles can be used with devices in addition to a printer and a monitor, such as a scanners, facsimile machines, etc.

The profile connection space is defined by a standard illuminant of D50, the 1931 CIE standard observer, and 0/45 or 45/0 reflectance measurement geometry. The reference viewing condition is ANSI PH2.30-1989, which is a D50 arts viewing environment.

An ICC profile, an example of which is shown in FIG. 4, includes two basic elements: header 39 and tag table 40. Header 39 includes information which is used by CMM 9 to process input image data in accordance with the ICC profile. The header data must be in big-endian notation. Tag table 40, which is described in more detail below with respect to FIG. 4, is used by CMM 9 to access color transformation operations and other information via public and private tags.

Included in an ICC profile are required public tags, which are designed to provide a complete set of information necessary for a CMM to transform color information between the profile connection space and device-dependent color spaces. Additionally, an ICC profile can include optional public tags which can be used to perform additional transformations, and private tags, which individual developers can customize to add proprietary value to their ICC profile.

For an input device, such as a scanner, CMM 9 requires that a profile have the following tags, in order to perform a color transformation: a profile description tag, a device manufacturer tag, a device model name tag, a media XYZ white point tag, a UCCMS private information tag, a copyright tag, a red colorant tag which contains relative XYZ tristimulus values of a red channel, a blue colorant tag which contains relative XYZ tristimulus values of a blue channel, a green colorant tag which contains relative XYZ tristimulus values of a green channel, a red channel tone reproduction curve tag, a green channel tone reproduction curve tag and a blue channel tone reproduction curve tag. Optionally, the profile can contain an AtoBn tag which defines an 8 bit or 16 bit LUT.

For a display device, such as a monitor, CMM 9 requires that a profile have the following tags, in order to perform a color transformation: a profile description tag, a device manufacturer tag, a device model name tag, a media XYZ white point tag, a copyright tag, a red colorant tag which contains relative values of red phosphor, a blue colorant tag which contains relative values of blue phosphor, a green colorant tag which contains relative values of green phosphor, a red channel tone reproduction curve tag, a green channel tone reproduction curve tag and a blue channel tone reproduction curve tag. Optionally, the profile can contain a UCCMS private information tag.

For an output device, such as a printer, CMM 9 requires that a profile have the following tags, in order to perform a color transformation: a profile description tag, a device manufacturer tag, a device model name tag, an AtoB0 Tag, a BtoA0 tag, a gamut tag, an AroB1 tag, a BtoA1 tag, an AtoB2 tag, a BtoA2 tag, a UCCMS private information tag, an XYZ media white point tag, a measurement tag and a copyright tag.

The foregoing AtoBn tags have either ICC lut8type or lut16Type structures. The general model for the ICC lut8type or lut16Type structures is:

matrix→one-dimensional LUT→multidimensional LUT→one dimensional LUT→

In an lut8type tag, input, output and color LUTs are arrays of 8 bit unsigned values. Each input table consists of one byte integers. Also, each input table entry is appropriately normalized to a range of 0 to 255. When stored in a tag, a one-dimensional LUT is assumed to be packed one after another in ascending order according to ICC specifications.

The AtoB0 tag is used for photographic rendering. The AtoB0 tag defines a three-by-three matrix, in which matrix elements are stored in bytes 12 to 45 of the AtoB0 tag, an input channel for c, M, Y inputs is stored in byte 8, an output channel for L, a, b outputs is stored in byte 9, LUT grid points (e.g., 33×33×33) are stored in byte 10, padding is stored in byte 11, input tables (identity) are stored in bytes 46 et seq., where color LOTs and output tables are also stored for photographic rendering. Bytes 0 to 3 define the tag.

The BtoA0 tag has the same format as the AtoB0 tag except that the input tables and output tables are switched and the color LUT has the inverse of the AtoB0 tag.

The gamut tag has the same format as the AtoB0 tag except the gamut tag uses L, a, b values for the input channels and a bitmap output for the output channels.

The AtoB1 tag is used for relative colorimetric rendering and has a format that corresponds to the AtoB0 tag, while the BtoA1 tag is used for relative colorimetric rendering and has a format that corresponds to the BtoA0 tag. Both are either lut16type or lut8type.

The AtoB2 tag is used for saturation rendering and has a format that corresponds to the AtoB0 tag, while the BtoA2 tag is used for saturation rendering and has a format that corresponds to the BtoA0 tag. Both are either lut16type or lut8type.

CMM 9 also supports an optional preview profile public tag. The tag has a format identical to the AtoB0 tag except that L, a, and b data is input to the input channel.

The present invention, as described in more detail below, uses customized private tags to modify and manipulate color transformation operations performed within a predetermined Icc profile.

In the present invention, CMM 9 includes profile manager routine 12 (e.g., ColorGear®, produced by Canon Information Systems, Inc.), which accesses ICC profile 8, and/or various public and private tags stored therein, to create or modify the private tags (and/or the device profile).

Figure 5:
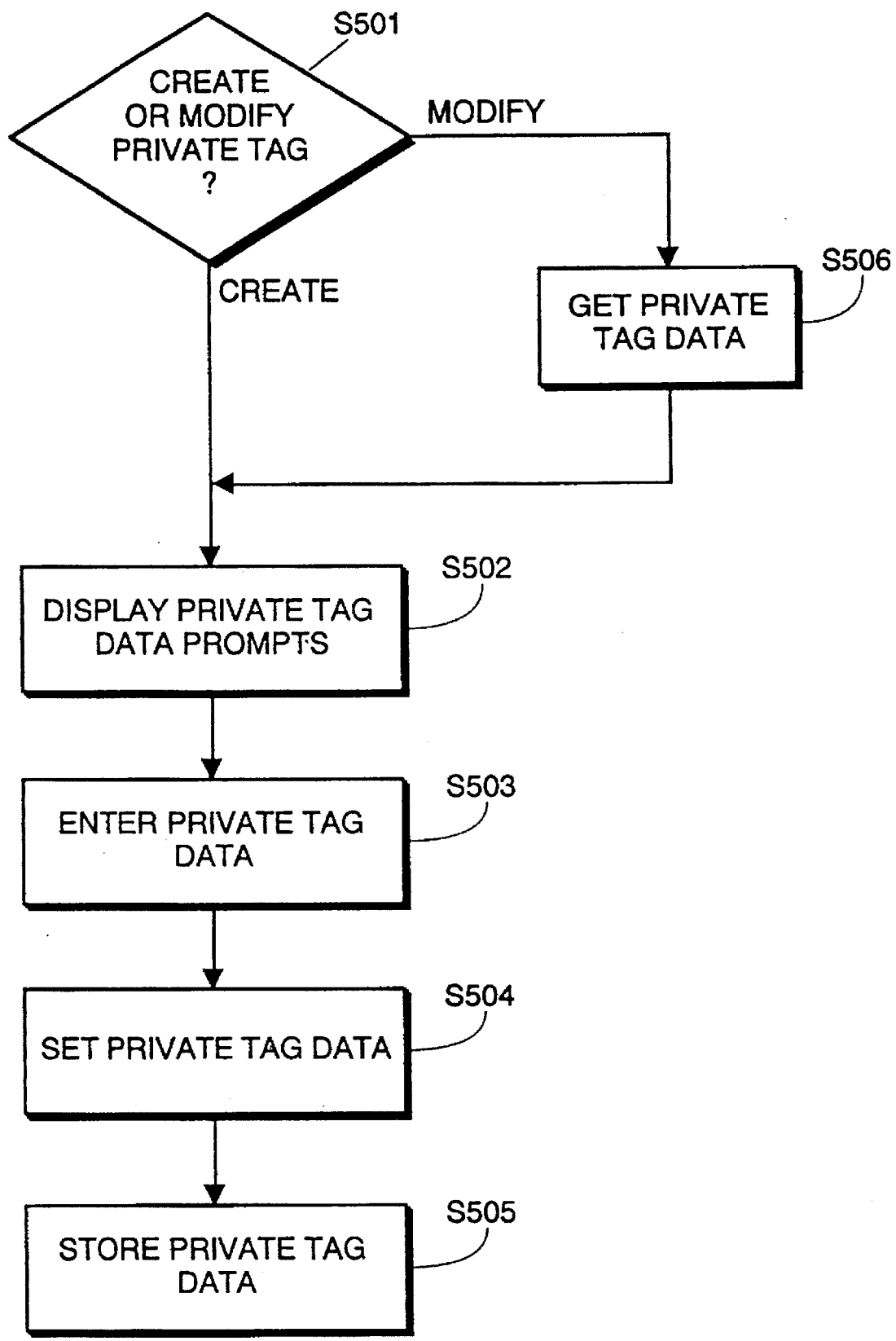
FIG. 5 shows a flow diagram for creating and modifying private tags.

Creation or modification of a private tag is performed in accordance with the flow diagram shown in FIG. 5, which depicts operation of private tag creation and modification application program 10 for entering information into private tags. More specifically, upon execution of application program 10, in step s501, it is determined whether a private tag is being created or modified. If a private tag is being created, processing proceeds to step s502, where a user is prompted on display screen 2 for information necessary to create a private tag. If the user fails to enter all of the required information, a private tag cannot be created. Examples of screens with which the user is prompted are shown in FIGS. 6 and 7. It is noted that screens 43 and 44, shown in FIGS. 6 and 7, respectively, correspond to the private tag depicted in FIG. 8, which is discussed in more detail below.

If, however, in step s501, a private tag is being modified, processing proceeds to step s506 in which the user clicks on "Get" button 42 on input screen 43 (or input screen 44). In response, application program 10 requests private tag information from profile manager routine 12 based on information on the screen. Profile manager routine 12 then accesses the required areas of memory for the private tag data and provides the requested data to application program 10.

Upon receipt of the private tag data, in step s502, application program 10 displays the information to the user on screens 43 and 44. The user can then set information in the private tag as desired by entering the information on screens 43 and/or 44 and by clicking on "Set" button 46. The user can page through private tag data using "Next" button 47 and "Previous" button 48, shown in FIGS. 6 and 7.

Upon entry of information onto the screen in step s503, processing proceeds to step s504, in which the user sets the private tag data by clicking on "Set" button 46. Once the user sets the private tag data, the private tag data is transmitted from application 10 to profile manager routine 12. Upon receipt of the private tag data, in step s505, profile manager routine 12 stores the private tag data in accordance with the byte assignments provided in the private tag. For example, in the ucmI private tag shown in FIG. 8 and described in more detail below, "Canon Signature" is stored in bytes 4 to 7, while "Creator Division" is stored in bytes 112 to 175, and so on. In this manner, a user can alter information stored within a private tag.

As described above, FIG. 4 shows a screen printout of an example of ICC profile 8 which includes header 39 and tag table 40.

Header 39 provides a set of parameters specific to ICC profile 8, and is preferably stored in the first 128 bytes thereof. Parameters included in header 39 are described below.

1. "Size", stored in bytes 0 to 3 of header 39, defines the profile's size.
2. "CMMType", stored in bytes 4 to 7, defines the CMM with which the profile is associated. For Canon® devices, this value is "UCCM".
3. "Version", stored in bytes 8 to 11, defines the profile's version number. This is defined by the ICC as $2000000_H$.
4. "ProfileClass", stored in bytes 12 to 15, defines the profile's class, and may be any one of "prtr (printer), "mntr" (monitor), "scnr" (scanner), "link" (link device), "spac" (color space conversion), and "abst" (abstract profiles).
5. "DataColorSpace", stored in bytes 16 to 19, defines the color format into which the profile converts color image data, and may be any one of "RGB", "XYZ", "GRAY", "CMY", "Luv", "HSV", "CMYK", "YCbr", "HLS", "Lab" and "Yxy".
6. "InterchangeSpace", stored in bytes 20 to 23, defines the profile connection space, and may be either "LAB" or "XYZ".
7. "CreationDate", stored in bytes 24 to 35, defines the date and time that the profile was created.
8. "CSZSignature", stored in bytes 36 to 39, defines the profile's file signature, which is used by the operating system of a device using the profile to create an icon. This value is set to "acsp" for all ICC profiles.
9. "Prim.platform", stored in bytes 40 to 43, defines the primary platform or operating system for which the profile was created, and may be any one of the following values: "Appl" (Apple operating system), "MSFT"

(Microsoft operating system), "SGY" (Silicon Graphics), "SUNW" (Sun) and "TGNT" (Tallgent).

10. "Flags", stored in bytes 44 to 47, defines various hints for a CMM, such as distributed processing and caching options. This parameter is not used in Canon® devices and is therefore set to $0_H$.

11. "DeviceManufacturer", stored in bytes 48 to 51, is the signature for the manufacturer of the device with which the profile is to be used. This parameter has a value of "CANO" for Canon® devices.

12. "DeviceModel", stored in bytes 52 to 55 defines the model number or name of the device with which the profile is to be used. The value of "DeviceModel" must be conform to the standard imposed by the ICC, Apple ColorSync® and Microsoft ICM®. Specifically, the model number or name must be a 4 byte ASCII string using characters "A" to "Z" (capital letters only and characters "0" to "9"). The format of "DeviceModel" should be:

<1st byte: Division ID>

<2nd–4th byte: Model number and extension>, where "Division ID" identifies the company or division which created the product. Ideally, each company or division should have a unique "Division ID". In Canon Inc., divisions are defined as follows: "B" stands for bubble jet, "C" stands for copier, "D" stands for digital camera, "F" stands for facsimile, "L" stands for laser beam printer, "M" stands for Canon® monitor, "S" stands for scanner, "V" stands for video camera, "Z" stands for third-party, non-Canon® product files. These values are randomly determined and can be set as desired. In preferred embodiments, bytes 2–4 of "deviceModel" are encoded according to one of the following two formats.

a. Format 1:

<1 byte: Division byte>

<2 bytes: model name>

<1 byte: extension>

As described above, the division byte stores the division of the device using the profile. The model name bytes store the device model. The extension byte stores the extension of the device, e.g., BJ-600e would be an extension of a BJ-600 device. To avoid two devices having a same "deviceModel", the following convention has been adopted. A–I are used as extension indicators for nine extensions; J–R are used as the next nine extension indicators when there is a collision of the first three bytes; S–Z are used as extension indicators for the next 8 extensions; and 0–9 are used as extension indicators for the next 10 extensions. An example of this system is shown below:

BJC-4000→B40A (first extension of BJC 4000),

BJC-4000E→B40B (second extension of BJC-4000),

BJC-400→B40J (first extension of BJC-400), and

BJC-400X→B40K (second extension of BJC-400).

b. Format 2:

<1 byte: Division byte>

<3 bytes: Model ID+extension>

In this format, division byte is the same as division byte described above, and model ID and extension number are determined so as to ensure that two different devices do not have the same "deviceModel". In the second format, a mathematical algorithm is used to calculate a unique model ID+extension from the actual model number, e.g, from the "600" in BJC-600. However, any method may be used so long as it produces unique "deviceModel" values for each device.

13. "DeviceAttributes", stored in bytes 56 to 63, are attributes which are unique to the particular device setup. In the present invention, media type, resolution, halftoning ink type and creator must be specified. A preferred format for "deviceAttributes" is as follows: bytes 56 to 57 reserved for the ICC, byte 58 for media type, byte 59 for resolution, byte 60 for screening, byte 61 for ink type and bytes 62 to 63 reserved for future use.

In a preferred embodiment, media type, resolution, screening and ink type have values defined as follows:

a. Media Type

0: Not Applicable/Do Not Care
1: Plain Paper
2: Coated Paper
3: Glossy Paper
4: OHP Paper
5: High Glossy Film
6: Fine Coated Paper
7: BPF Paper
8: Textile Paper b. Resolution 0: Not Applicable/Do Not Care
1: 180×180 dots per inch (dpi)
2: 200×200 dpi
3: 300×300 dpi
4: 360×360 dpi
5: 400×400 dpi
6: 600×300 dpi
7: 600×600 dpi
8: 720×360 dpi
9: 720×720 dpi
10: 1200×600 dpi
11: 1200×1200 dpi c. Screening 0: Not Applicable/Do Not Care
1: Pattern 1
2: Pattern 2
3: Pattern 3
4: Erroneous Diffusion
5: Continuous tone Pattern 1
6: Continuous tone Pattern 2
7: Continuous tone Pattern 3 d. Ink Type

0: Not Applicable/Do Not Care
1: normal ink
2: ink type 1

Modifications to the foregoing values can be performed as required.

14. "RenderingIntent", stored in bytes 64 to 67, defines an intent (i.e., perceptual, relative colormetric, saturation and absolute) for which the profile is designed. In the present invention, this value is 0.

15. "WhiteXYZ", stored in bytes 68 to 79, defines illuminant values of the profile connection space. In the present invention, this value is set to D50.

16. Bytes 80 to 127 are reserved by the ICC for future use.

Header 39 is not intended to be an exhaustive list of all information which can be stored in a profile header. Rather, it is merely shows examples of information that can be stored in a profile header.

Other information, in addition to that described above, may be added to the header as needed or desired. To this end, the ICC has reserved 48 bytes, as indicated above, for future use. However, in order to implement the present invention, all of the information shown in header 39 must be present.

Tag table 40 includes a list of tags, both public and private, and information relating to the tags. In the profile, tag table 40 begins at byte 128 (i.e., after header 39). More specifically, as shown in tag table 40, "Ind" indicates the number of tags in tag table 40, "Signat" is a tag signature, and is used by CMM 9 to locate a particular tag; "element-Offset" is the location in memory, in both decimal and hexadecimal numerals, at which the tag begins; and "size" defines the size of the tag in bytes.

Each individual tag in tag table 40 is structured such that bytes 0 to 3 thereof define the tag signature, bytes 4 to 7 define an offset value which points to the beginning of the tag data, and bytes 8 to 11 defines the number of bytes in the tag.

As stated above, public tags define stock color transformation operations which are available for use in all ICC profiles. An example of a public tag provided in tag table 40 is A2B2, which contains a 3×3 color transformation matrix process, a three-dimensional LUT and two sets of three one-dimensional LUTs. Other examples of public tags are described in more detail in the International Color Consortium Profile Format document.

In tag table 40, tags having "Ind" values of 0 to 16 comprise public tags, while tags having "Ind" values of 17 and 18 comprise private tags. In this case, the private tags are Canon®-registered private tags.

The present invention will be described with respect to the foregoing two private tags, in conjunction with the public tags listed in tag table 40. It should be noted, however, that the present invention can be used with any of the public tags listed in the International Color Consortium Profile Format document or with any tags compatible therewith.

In brief, the present invention is a system of performing a color transformation operation on input image data, the system using a first tag and a second tag to perform the color transformation operation in place of a predetermined series of color transformation operations stored in a public tag in a profile format. The system includes an inputting step for inputting color image data, a storing step for storing a first tag and a second tag, the first tag for storing override information for overriding the predetermined series of color transformations, and the second tag for storing color transformation operation data accessible via a hierarchical storage structure, and a determining step for determining, based on the override information in the first tag, whether to access the second tag. Also included in the system are a reading step for reading the color transformation operation data in the second tag in a case that the determining step determines to access the second tag, the reading step following pointers within the hierarchical storage structure to access the color transformation operation data in the second tag, and a processing step for performing a color transformation operation on the input image data in accordance with the color transformation operation data read in the reading step.

Figure 9:
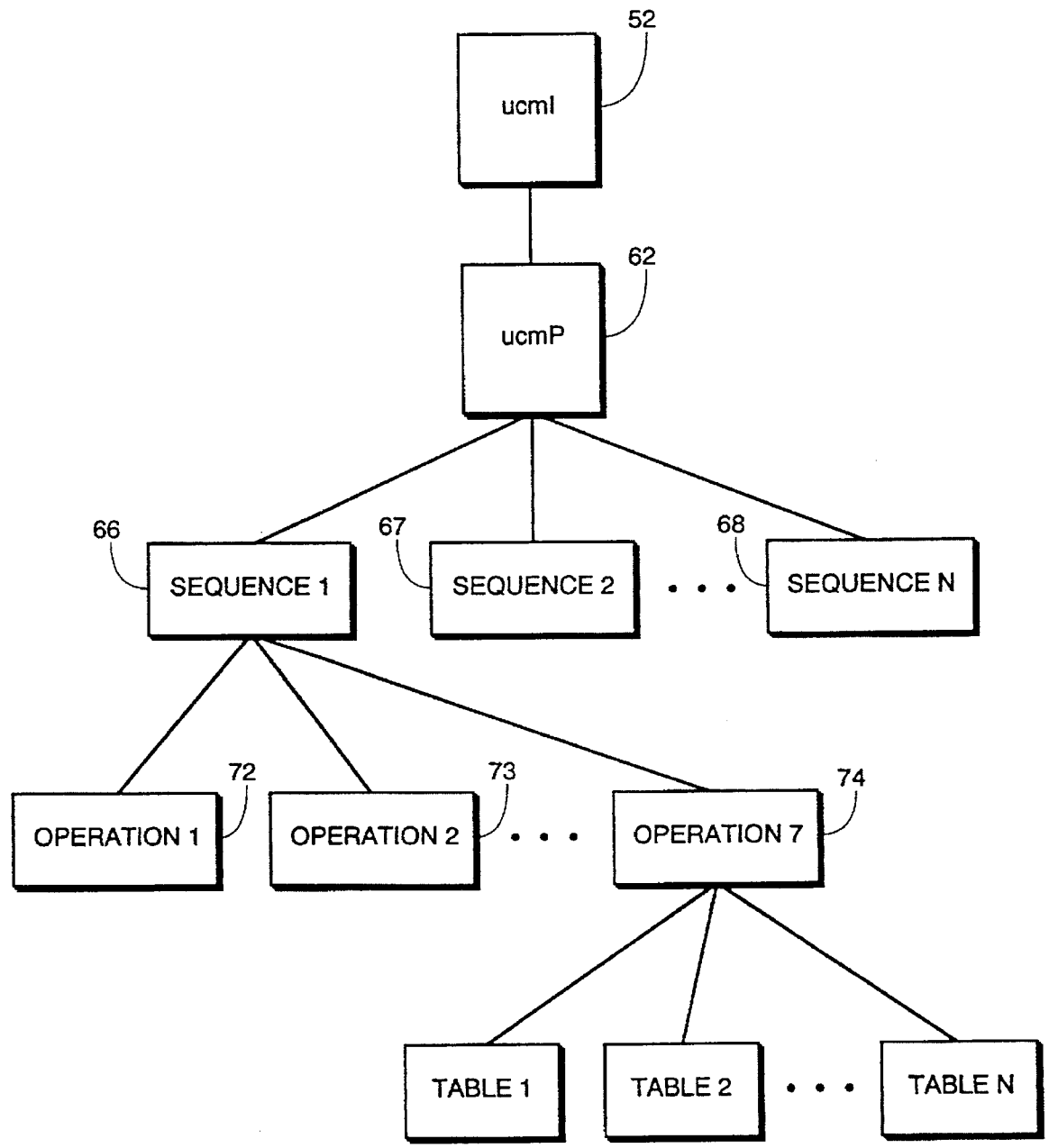
FIG. 9 shows the hierarchical relationship between the private tags created by the present invention.

The present invention stores color transformation operations and calls to other public and private tags in a hierarchical structure. This hierarchical structure is shown in FIG. 9, which will be discussed in detail below in connection with a detailed discussion of each of the elements shown therein.

The private tag having an "Ind" value of 17, hereinafter referred to by its signature "ucmI" and reference numeral 52, contains information concerning the interaction of private tags in ICC profile 8 with public tags in ICC profile 8. In addition, ucmI 52 contains information required by CMM 9 to perform color matching using the private tags. If ucmI 52 is missing, CMM 9 uses default settings to interpret the profile. As shown in FIG. 8, this information is stored byte-sequentially in ucmI 52.

More specifically, column 53 of ucmI 52 defines bytes of ucmI 52 which store the data in column 56. Column 54 describes the data stored in the bytes of column 53, and column 57 defines the format for the data stored in the bytes of column 53. At this point it should be noted that "uInt32" stands for a 32-bit unassigned integer, while the notation "0x" followed by a number indicates that the number is in hexadecimal format.

The data stored in ucmI 52 includes "uccmsPrivateInformationTag Signature", which is a tag-specific identifier, by which CMM 9 can access ucmI 52; "Canon Signature", which is a secondary identifier, for identifying the private tag as a Canon® private tag; "Size of parameters in bytes", which define parameter data sizes for parameters (to be described in more detail below) used in color transformation operations; "Engine version", which defines the minimum CMM version required to read the profile; "Profile Format Document version", which defines the version of the profile; "Profile version", which defines the profile version assigned by its creator; "Profile Build number", which defines the build number of the subject profile; "Interpolation flag", which defines the type of linear interpolation to be used by the profile; override elements, stored in bytes 32 to 71 (discussed in greater detail below), which store the Sequence Canon ID number required to override a particular public tag, such as A2B2; optimization flag values, stored in bytes 72 to 111, which store optimization flags for CMM 9 which indicate printing mode type, e.g., draft mode; "Creator Division", which defines the Canon® division that created the profile; "Support Division", which defines the Canon® division that supports the profile; Von Kries Flag, which determines whether or not to use a Von Kries color transformation; and reserved bytes.

Figure 10A:
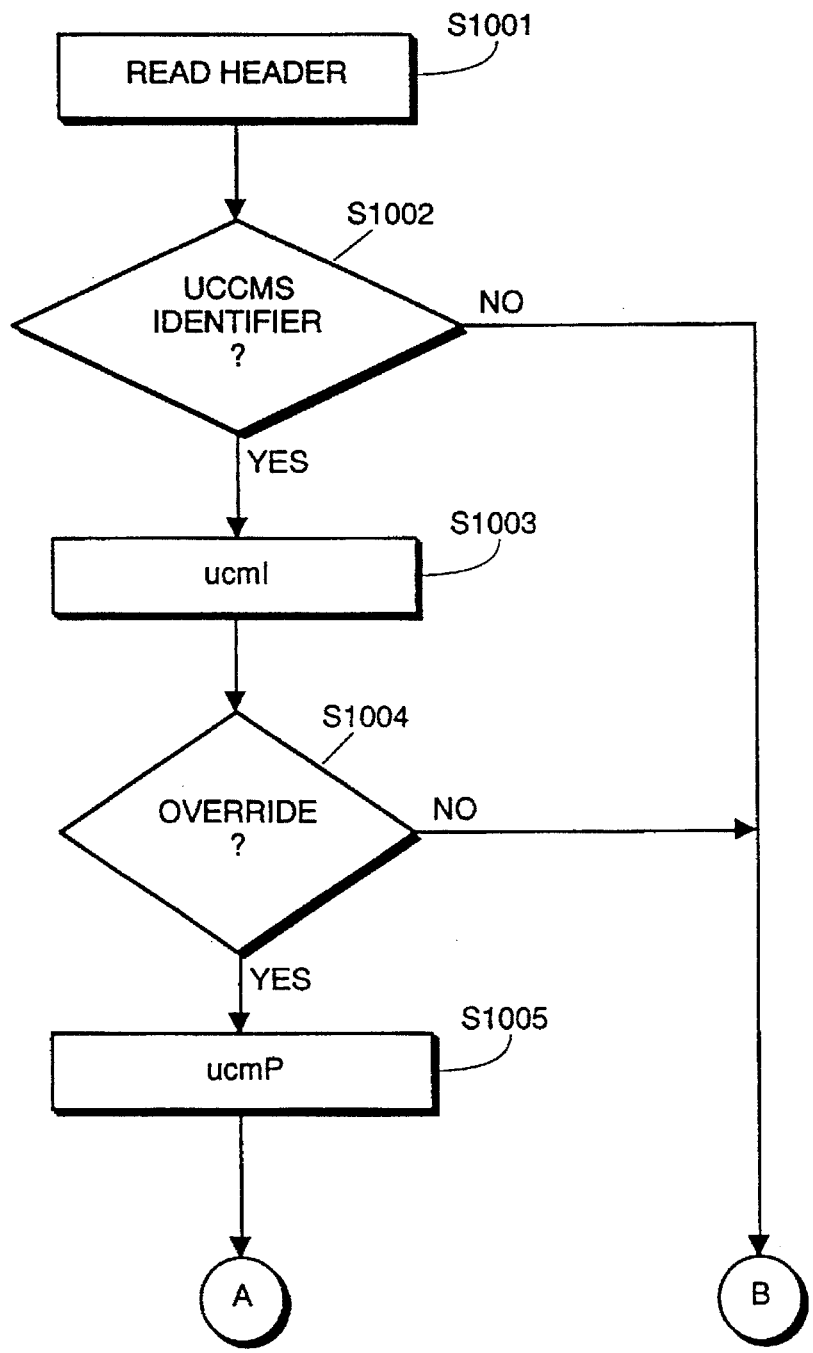
FIG. 10, comprised of FIGS. 10A and 10B, shows a flow diagram for setting up a color transformation process according to the present invention.
Figure 10:
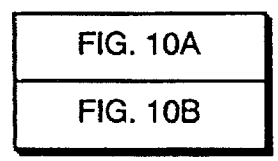
Figure 10B:
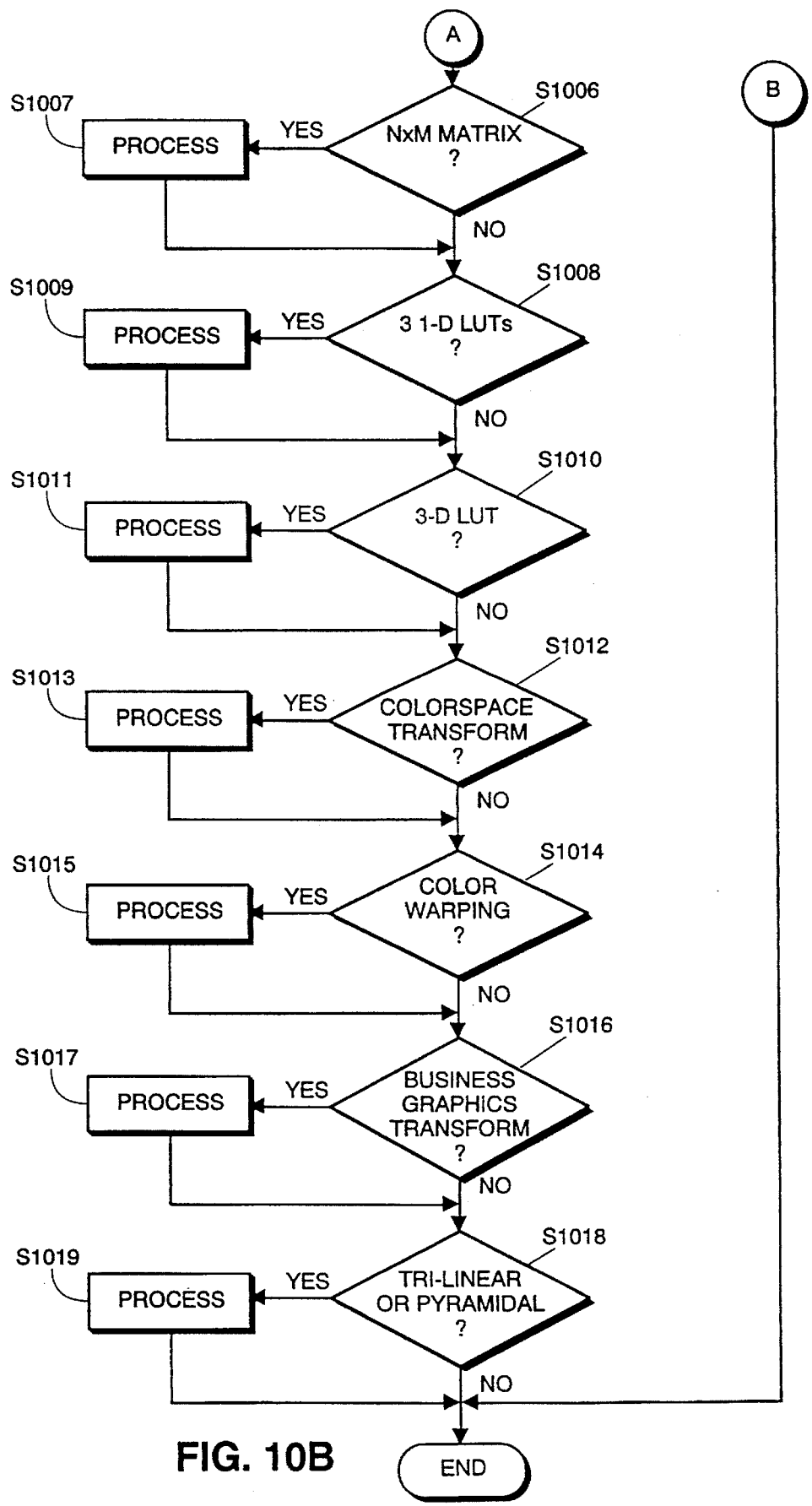

FIG. 10 is a flow diagram which shows the process by which CMM 9 navigates through ICC profile 8 and the public and private tags associated therewith. More specifically, in step s1001, CMM 9 reads the CMMType of profile 8 found in header 39. CMMType corresponds to a pointer to an area of memory which contains the value stored therein.

Next, in step s1002 of FIG. 10, if CMM 9 determines, based on the CMMType in header 39, that profile 8 is a "UCCM" profile, as is the case for profile 8, processing proceeds to step s1003 in which CMM 9 performs color transformation operations in accordance with ucmI 52, and not in accordance with public tags. Thus, as shown in FIG. 9, ucmI 52 is at the top of the storage hierarchy.

More specifically, CMM 9 reads ucmI 52's signature found in bytes 0 to 3 of ucmI 52, and accesses the "element-Offset" area in memory that corresponds to ucmI 52, in this case byte $256678_{10}$ (see FIG. 4).

Thereafter, in step s1003 of FIG. 10, CMM 9 reads the data in bytes 32 to 71 of ucmI 52, and based thereon determines whether any of the operations defined by the public tags in profile 8 are overridden. In this regard, if there is a $0_H$ in an override area of ucmI 52, then CMM 9 performs color transformation according to a process stored in a corresponding public tag. If there is a non-zero value in an override area of ucmI 52, then CMM 9 performs color transformation according to the process stored in ucmI 52 and defined by the non-zero value. For example, as shown in FIG. 8, AtoBOTag override 59 has a value of "0×0" or $0_H$. Based on this information, CMM 9 will perform any AtoBOTag color transformation process in accordance with color transformation processes stored in the AtoBOTag public tag. Accordingly, with respect to the AtoBOTag color transformation process, flow proceeds to end in FIG. 10.

However, as also shown in FIG. 8, BtoA2Tag override 60 has a value of "0×33" or $33_H$, which serves as a pointer to an area in memory. Therefore, with respect to color transformation operations for BtoA2Tag, processing proceeds in accordance with information stored in ucmI 52, and not in accordance with the BtoA2Tag public tag.

More specifically, as shown in FIG. 10, processing proceeds to step s1005, in which the private tag having "Ind" value of 18, hereinafter referred to by its signature "ucmP" and reference numeral 62, is automatically read by the CMM.

FIG. 11 shows an example of ucmP 62. As shown in FIG. 11, ucmP 62 stores information byte-sequentially in the same format as ucmI 52. For the sake of brevity, a detailed description of the storage format is therefore omitted.

The information stored in ucmP 62 comprises "uccmsPrivateSequencesTagTable Signature", which is a tag-specific identifier, by which CMM 9 accesses ucmP 62; "Canon Signature", which is identical to "Canon Signature" described above with respect to ucmI 52; "Number of Sequences", which defines the number of color transformation sequences to be performed via ucmP 62; and "Sequences structures", which define a series of color transformation operations to be performed in the particular color transformation sequence, along with other relevant information required by CMM 9 to perform the color transformation sequence. It is noted that while FIG. 11 shows merely four sequences structures, any number of sequences structures can be added to ucmP 62, the number of sequences structures being limited only by the hardware on which the present invention is run.

The sequences structure for a color transformation sequence is shown in FIG. 12. It is noted that while particular operations in the color sequences can vary, along with other parameters therein, the structure of the sequences is fixed.

More specifically, all color transformation sequences contain "CanonID", which is the sequence by which CMM 9 accesses the particular sequences structure. In this case, the "CanonID" is $33_H$, which corresponds to BtoA2Tag override 60 from ucmI 52 in FIG. 8. Through this correspondence, CMM 9 is able to determine, based on ucmI 52, which color matching sequence to access in ucmP 62.

The color transformation sequences structure also includes "reserved bytes", which for the time being maintains a value of $00_H$; "numOpers", which define the number of operations in the color transformation sequence, and which is discussed in more detail below; "seqPCS", which defines the profile connection space into which the subject profile converts data; "length", which defines the length in bytes of the parameters used in the operations to be performed by the color transformation sequence; and "offset", which defines the beginning point in memory of the color transformation operations to be performed by the color transformation sequence.

As shown in FIG. 12, the sequences structure also defines the format of the data stored therein. In this case, as shown, the format is "uInt32", which, as indicated above, corresponds to a 32 bit unassigned integer.

The sequences structure comprises a byte string, which is stored in column 65 of ucmP 62 in bytes 16 to 39, shown in FIG. 11. Thus, for the example shown in FIGS. 11 and 12, "CanonID" is 33, "reserved" is 00, "numOpers" is 04, "seqPCS" is LAB, "length" is 40, and "offset" is 5163. These values are stored as data in bytes 16 to 39 of sequences structure 1. Similarly identifiable sequences structures can also be stored in sequences structures 2 to 4. However, for the sake of brevity, the present invention will only be described with respect to the foregoing sequences structure. Accordingly, as shown in FIG. 9, ucmP 62 is next in the hierarchical storage structure after ucmI 52, followed by various available sequences structures 66 to 68.

To summarize up to this point, since a $33_H$ was present in BtoA2Tag override 60 in ucmI 52, and since sequences structure 1 has a CanonID of $33_H$, CMM 9 reads sequences structure 1.

As described above, each sequences structure includes a "numerOpers" value, a "length" value and an "offset" value. CMM 9 uses these values to access color transformation operations stored within the sequences structures. More specifically, since (1) each color transformation operation is of a fixed length, defined by "length", (2) the number of color transformation operations, defined by "numerOpers", is known, and (3) the area in memory where the color transformation operations are sequentially stored is known, CMM 9 can parse each color transformation operation and perform the operation based on information stored in the sequences structure. This process will be described in more detail below.

FIG. 13 shows the structure of a color transformation operation. More specifically, the structure of color transformation operations is defined as follows: "oper" defines type of color transformation operation to be performed; "subid" defines a subidentification number for a particular color transformation operation, which is described in more detail below; "length" defines the length of a parameter list in the color transformation operation; "tagFlag" defines a call to another public or private tag in the case that "tagFlag" has a non-zero value, or a call to color transformation operations stored within the parameter list in the case that "tagFlag" has a zero value; and "parm" defines the parameter list used in the color transformation operation.

There are seven color transformation operations that can currently be performed using the present invention. These seven color transformation operations, each of which is defined by a UCCMS Operation Number in parentheses, include (1) N×M matrix, (2) three one-dimensional LUTs, (3) three-dimensional LUT, (4) ColorSpace transformation, (5) Shift Hues (color warping), (6) Business Graphics transformation, and (7) one three-dimensional tri-linear or pyramidal LUT. Color transformation operations can be added to or deleted from this list as desired.

Each of the foregoing color transformation operations performs different operations on input color image data. For example, the N×M matrix could be a 3×3 matrix which is used to transform color image data from an XYZ color space to an RGB color space. Similar color transformations could be performed in accordance with other operations accessed from a sequences structure.

CMM 9 stores a list of the foregoing seven operations. When CMM 9 determines, based on the "opers" value in a sequences structure, that one of the operations is to be performed on color image data, CMM 9 reads the data for the operation to be performed from a private tag which specifies the color transformation operation, and performs the color transformation operation on the color image using the data. The following describes accessing data for the operation to be performed from a specified private tag.

More specifically, in accordance with FIG. 10, each color transformation operation structure is read from the sequences structure, and based thereon, it is determined which type of color transformation operation to perform. For example, if CMM 9 reads a "1" as the "oper" value, which acts as a pointer to an area in memory, for a particular color transformation operation, CMM 9 accesses the color transformation operation that corresponds to "1", which in this case is N×M matrix. FIG. 9 further shows the relationship of color transformation operations to the sequences structure 66, i.e., they are lower in the hierarchy than sequences structure 66.

FIG. 14 shows an example of N×M tag 80, which contains data used to perform UCCMS Operation 1, the N×M matrix. As shown in FIG. 14, the format of the private tag used to implement the N×M matrix is similar to that used to implement ucmP 62. Accordingly, a detailed description of the format will be omitted for the sake of brevity. It is noted that the format and structure of each of the private tags used for color transformation operations is the same as that of N×M tag 80.

N×M tag 80, shown in FIG. 14, includes "Operation ID", which as described above, defines the type of color transformation operation performed by the private tag; "Sub ID", which is described in more detail below, and which is not used in this case; "Length of Parameter List in bytes", which defines the length of the parameter list described below, and which is used to access the parameter list; Tag Flag, which is not used in this case, and which is described in more detail below; and "Parameter Data", which defines parameters to be used in the color transformation operation. As shown in FIG. 14, the parameters used in the N×M matrix, in this case N and M both being 3, are the N dimension of the matrix, the M dimension of the matrix, and each of the matrix elements.

Thus, when CMM 9 determines, in accordance with step s1006 of the flow diagram shown in FIG. 10, that an N×M color transformation operation is to be performed, CMM 9 reads the parameter data stored in N×M tag 80, and performs the color transformation operation, defined by "Operation ID", in accordance with the read parameters in step s1007.

In the case that an "oper" value for a color transformation operation defined in sequences structure 1 is 2, processing proceeds to step s1008, and thereafter to step s1009. Steps s1008 and s1009 define a color transformation operation which includes a one-dimensional LUT. FIG. 15, comprised of FIGS. 15A and 15B, shows two examples of private tags which could be used to create LUTs for color transformation operation 2.

FIG. 15A shows 1DLUT tag 81 that defines a LUT for color transformation operation 2, in which a call is made to a public tag or another private tag from 1DLUT 81. More specifically, in FIG. 15A, the "Tag Flag" value is "A2B2". "Tag Flag" defines a call to another tag, in this case the "AtoB2" public tag. Thus, when CMM 9 reads 1DLUT 81 and encounters "A2B2" as the value for "Tag Flag", CMM 9 accesses the "AtoB2" public tag and performs color transformation operations in accordance therewith. In this case, therefore, no "Parameter Data" is required, since the color transformation operation is performed in accordance with data stored in a public tag. Consequently, the "Length of Parameter List" also has a value of zero.

Advantageously, the present invention permits a user, by setting a "Sub ID" value, to select a particular color transformation operation within the public tag specified in "Tag Flag". That is, each public tag, such as "AtoB2", may contain more than one color transformation operation. The present invention provides for selection of one of the color transformation operations within the public tag. For example, public tag "AtoB2" contains a 3×3 matrix and 3 LUTs: an input LUT from lut8type/lut16type, an output LUT from lut8type/lut16type and a LUT from curve-type. By setting the "Sub ID" value to 0, 1 or 2 in 1DLUT tag 81, CMM 9 will only perform one of the color matching operations provided in public tag "AtoB2". Moreover, since CMM 9 knows, based on the "Operation ID" in 1DLUT tag 81, that LUT operations are to be performed, CMM 9 will only select a LUT stored in public tag "AtoB2", and will not select, for example, the 3×3 matrix.

In a preferred embodiment of the present invention, a value of "0" in "Sub ID" directs the CMM to use the input LUT from lut8type/lut16type; a value of "1" in the "Sub ID" directs CMM 9 to use the output LUT from lut8type/lut16type; and a value of "2" in the "Sub ID" directs CMM 9 to use the LUT from curve-type, all of which, as indicated above, are stored in public tag "AtoB2". Similar specifications can be made for each of the public tags shown in FIG. 4, and for any other public tags which may contain plural color transformation operations.

FIG. 15B shows an example of 1DLUT tag 82 for color transformation operation 2, in which "Tag Flag" is zero, i.e., in which color transformation operations are to be performed in accordance with information in the private tag, and not in accordance with information in a public tag. Thus, in 1DLUT tag 82, "Length of Parameter List" is $771_{10}$, which, as described above, indicates the length in bytes of the "Parameter Data" stored in bytes 16 et seq. of 1DLUT tag 82. The "Parameter Data" defined in 1DLUT tag 82 includes parameter data necessary to perform a color transformation operation, such as a gamma correction, using a LUT. Thus, as shown in FIG. 15B, the "Parameter Data" includes the dimensions of the LUT, the number of input and output bits for input and output data, respectively, and values for the LUT. As noted above, the number of parameters, and thus the size of the LUT, are not limited by the private tag. Rather these values are only limited by the capacity of the computing equipment on which the present invention is implemented.

Returning to FIG. 10, in the case that an "oper" value for a color transformation operation defined in sequences structure 1 is 3, processing proceeds to step s1010 and thereafter to step s1011. Steps s1010 and s1011 define a three-dimensional LUT color transformation operation. FIG. 16 shows an example of a private tag which implements color transformation operation 3. A description of FIG. 16 is similar to that provided above with respect to FIG. 15, accordingly a detailed description of FIG. 16 is omitted for the sake of brevity.

Returning to FIG. 10, in the case that an "oper" value for a color transformation operation defined in sequences structure 1 is 4, processing proceeds to step s1012, and thereafter to step s1013. Steps s1012 and 1013 define a color space transformation operation.

FIG. 17 shows an example of a private tag (colorspace tag 84) which implements color transformation operation 4. In FIG. 17, "Operation ID" is 4, "Length of Parameter List" is 0 and "Tag Flag" is $0_H$. These values do not change, in this case. "Sub ID", in this case, defines which type of color space transformation operation is to be performed via colorspace tag 84. The following color space transformations, defined by "Sub ID" values 1 to 9, can be performed via colorspace tag 84:

0: RGB (Red, Green, Blue)→HLS (Hue, Lightness, Saturation),
1: HLS→RGB,
2: CMY (Cyan, Magenta, Yellow) →HLS,
3: HLS →CMY,
4: CIEXYZ →CIELAB,
5: CIELAB →CIEXYZ,
6: CIExyY →CIEXYZ,
7: CIEXYZ →CIExyY,
8: CIEXYZ →CRGB (Canon RGB), and
9: CRGB →CIEXYZ.

It should be noted that the foregoing list of color space transformations is not exhaustive, and additional color space transformation operations could be added thereto as desired.

In the case that an "oper" value for a color transformation operation defined in sequences structure 1 is 5, processing in FIG. 3 proceeds to step s1014, and thereafter to step s1015. Steps s1014 and s1015 define a color warping transformation operation. Briefly, a color warping transformation operation uses input RGB hue angles to correct CMYK errors in output color image data.

FIG. 18 shows an example of warping tag 88 which implements color transformation operation 5. In FIG. 18, "Operation ID" is 5, "Sub ID" is 0 and "Tag Flag" is $0_H$. These values do not change. In this case, the "Parameter Data" includes values necessary to perform the color warping transformation function, i.e., the RGB hue angles.

In the case that an "oper" value for a color transformation operation defined in sequences structure 1 is 6, processing in FIG. 10 proceeds to step s1016, and thereafter to step s1017. Steps s1016 and s1017 define a business graphics LUT which is useful, for example, for performing color transformation operations as described in currently-pending U.S. patent application Ser. No. 08/496,100, entitled "Color Management System Having Business Graphics Rendering Mode", the contents of which are hereby incorporated by reference into the present application. Business tags 89 and 90, shown in FIGS. 19A and 19B, respectively, correspond to 1DLUT tags 81 and 82, shown in FIGS. 15A and 15B, respectively.

As was the case above with respect to the private tags shown in FIG. 15, the private tags shown in FIG. 19 are accessed by CMM 9 via sequences structure 1 in ucmP 62. However, in the case that input data to be processed in accordance with the private tags shown in FIG. 11 have same values, CMM 9 does not perform a color transformation operation in accordance with either of the private tags shown in FIG. 19. Instead no color transformation operation is performed. Since this is the only difference between the color transformation performed in accordance with the private tags shown in FIG. 19 and those shown in FIG. 15, a detailed description of the color transformation operations defined by the private tags shown in FIG. 19 is omitted for the sake of brevity.

In the case that an "oper" value for a color transformation operation defined in sequences structure 1 is 7, processing in FIG. 3 proceeds to step s1018, and thereafter to step s1019. Steps s1018 and s1019 define a tri-linear or pyramidal interpolation process for performing three-dimensional linear interpolation.

In a preferred embodiment of the present invention, the private tag which performs tri-linear or pyramidal interpolation is configured similarly to the other private tags described above. FIG. 20 shows a preferred embodiment of private tag 92 which is used to perform color transformation operation 7. As shown in FIG. 12, in private tag 92, the "Operation ID" is 7, the "Sub ID" is 0 and the "Tag Flag" is zero. These values do not change. Also included is the "Length of Parameter List", which has a value that corresponds to the number of bytes comprising the parameters, and the "Parameter Data", which defines data for performing tri-linear or pyramidal interpolation.

Another embodiment of a private tag used for performing tri-linear or pyramidal interpolation in accordance with the present invention is shown in FIG. 21. More specifically, instead of including parameter data with which to perform a requisite color transformation operation, private tag 93 shown in FIG. 21 includes "Table ID". The "Table ID" value refers to another private tag which is used in the determination of whether tri-linear interpolation or pyramidal interpolation is to be performed. An example of this other private tag is shown in FIG. 22.

More specifically, FIG. 22 shows an example of private tag 94, called from private tag 93 shown in FIG. 21, which defines tables used to perform tri-linear or pyramidal interpolation.

Thus, as shown in FIG. 22, private tag 94, hereinafter referred to as ucmT 94, which is structured the same as other private tags in the present invention, includes the following elements: "uccmsPrivateInterpolation TableTag Signature", which is a tag-specific identifier, by which CMM 9 can access this private tag; "Canon Signature", which was described above with respect to FIG. 8; "Number of Tables", which defines the number of LUTs in ucmT 94; and "Table" N, where N=1, 2 . . . , which are LUTs, according to which CMM 9 performs tri-linear or pyramidal interpolation.

The "Table" values include a table header structure, an example of which is shown in FIG. 23. As shown in FIG. 23, the table header structure includes "tableID", which is a table-specific identifier; "length", which defines the length of the specified table; and "offset", which defines the point in memory at which the specified table begins. This information can be used to access different table in memory. As shown in FIG. 9, these table are accessed only from color transformation operation 7.

An example of a private tag which defines a LUT that can be accessed by ucmT 94 is shown in FIG. 24. LUT private tag 96 shown in FIG. 24 has a format identical to other private tags used in the present invention. LUT private tag 96 includes the following elements: "tableKind", which defines the type of operation performed by the LUT, i.e., either tri-linear interpolation, in which case "tableKind" has a value of 1, or pyramidal interpolation, in which case "tablekind" has a value of 0; "parentTag", which defines the parent tag for the LUT; "inChannels", which defines a number of input channels; "inBits", which defines a number of input bits used to address the LUT; "outChannels", which defines a number of output channels; "outBits", which defines a number of bits used for output, usually both this number and "inBits" is 8; "gridPoints3DTable", which defines the number of grid points in the LUT; and "gridPoints4DTable", which defines the number of grid points for a fourth channel, and which is used in pyramidal interpolation only. As described above, the foregoing information is used by the color matching method to perform tri-linear or pyramidal interpolation.

If parentTag is 0X00000000 and tableKind is tri-linear, then an entire interpolation color LUT is pointed to by ucmT 94. If a parentTag is 0X00000000 and tableKind is pyramidal, then a first dataset in the color LUT is defined as major grid data followed by minor grid data. If parentTag is the signature of a three-dimensional LUT in profile 8 and tableKind is tri-linear, the three-dimensional LUT is used as grid points and the rest of the fields, like inChannels are ignored. If parentTag is the signature of a three-dimensional LUT in profile 8 and tableKind is pyramidal, the three-dimensional LUT is used as major grid points and the color LUT contains only minor grid points.

Referring back to FIG. 10, in the case that none of the operations of steps s1006 to s1018 is performed, processing ends.

Additionally, it is noted that a private data tag, called "PrivateDataTableTag", can be modified by a user to include a user's private data, and stored at a point within the hierarchical storage structure.

Figure 25:
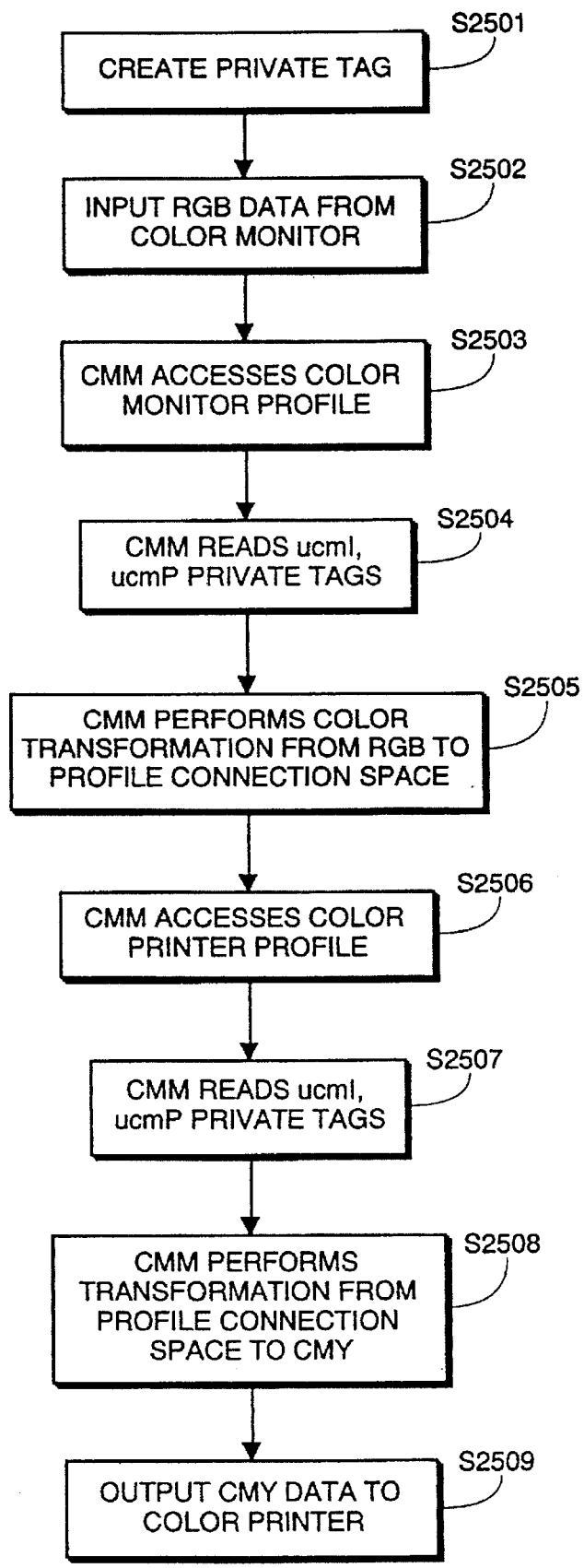
FIG. 25 is a flow diagram showing process steps for converting input image data from one color space to another color space using the present invention.

A brief explanation will now be provided, with reference to FIG. 25, of transforming color image data from color monitor 2 (RGB) color space to color printer 16 (CMY) color space, in accordance with the present invention. It should be noted that while such a color transformation process could possibly be performed using currently-available public tags, the following example will be described with respect to user-created private tags, so as to illustrate the invention.

Assuming there exists predefined ICC profiles for both color monitor 2 and color printer 16, in step s2501 a user executes above-described application program 10 for creating and modifying private tags. In accordance therewith, the user enters private tag information for transforming color image data from an RGB color space to a profile connection space for color monitor 2, and private tag information for transforming color image data from the profile connection space to a CMY color space for color printer 16.

Once private tags have been created for both color monitor 2 and color printer 16 in step s2501, processing proceeds to step s2502. In step s2502, CMM 9 inputs RGB color image data from color monitor 2. Thereafter, in step s2503, CMM 9 accesses the ICC profile for transforming the color image data from the RGB color space to the profile connection space.

Once CMM 9 accesses the color profile for color monitor 2, CMM 9 reads the profile to determine which tags listed therein to access. In this case, CMM 9 would read "UCCM" under CMM-Type, which would indicate that processing would proceed in accordance with the ucmI private tag, and not in accordance with standard ICC processes.

It must be noted that the ICC profiles used in the present example have a structure identical to that described above. Accordingly, in step s2504, CMM 9 reads the ucmI to determine which public and/or private tags are to act on the RGB data. In the present case, assuming that there is a non-zero value in an override area of the ucmI, CMM 9 locates the same non-zero value in one of the sequences structure areas of the ucmP.

Thus, by virtue of the foregoing steps, CMM 9 has determined which sequences of color transformation operations are to be performed on the RGB color image data, i.e., the color transformation operations accessed via the sequences structure that corresponds to the non-zero value in the override area of the ucmI.

Once CMM 9 determines the sequences of color transformation operations to be performed on the RGB color image data, CMM 9 accesses the data for each of the color transformation operations based on an "oper" value and storage location data for each color transformation operation in the sequences structure. In this manner, CMM 9 accesses the private tags that store color transformation operation data, such as elements in an N×M matrix.

Next, in step s2505, CMM 9 performs the color transformation operation, indicated by the "oper" value in the sequences structure, on the RGB color image data, using the parameters from the private tag referenced in the sequences structure. In the present case, the parameters and color transformation operation would be set so as to transform color image data from an RGB color image space to the profile connection space.

Following conversion to the profile connection space, processing proceeds to step s2506. In step s2506, CMM 9 accesses the ICC profile for color printer 16. It is noted that while the ICC for color printer 16 and the ICC for color monitor 2 can be stored in a single memory, such as disk 7, or in separate memories, storage in a single memory facilitates access by CMM 9.

Once CMM 9 accesses the color profile for color printer 16, CMM 9, as was the case above with respect to the ICC profile for color monitor 2, reads the profile to determine which tags listed therein to access. In this case, the CMM would read, under CMMType, "UCCM", which would indicate that processing would proceed in accordance with the ucmI private tag, and not in accordance with standard ICC procedures.

Thus, as described above, in steps s2506 to s2508, CMM 9 would access the ucmI and the ucmP private tags of the ICC profile for color printer 16 in order to transform the color image data from the profile connection space to the CMY color space of color printer 16. Since an overview of this processing is identical to that described above with respect to the ICC profile for color monitor 2, a detailed description thereof will be omitted for the sake of brevity.

Following step s2508, processing proceeds to step s2509, in which the color-transformed CMY color image data is output to printer 16.

It is noted that while the present invention has been described with respect to an ICC profile format, the present invention can be used with any type of cross-platform device format in which color transformation operations can be stored and accessed.

Likewise, it is further noted that while the present invention has been described with respect to a color monitor and a color printer, the present invention can be utilized with other color image processing devices, such as a color scanner or a color facsimile machine.

The invention has been described with respect to a particular illustrative embodiment. It is to be understood that the invention is not limited to the above-described embodiment and that various changes and modifications may be made by those of ordinary skill in the art without departing from the spirit and scope of the appended claims.

What is claimed is:

1. An apparatus for converting input color image data between a device-dependent color space and a device-independent color space using a device profile having both public tags through which an unalterable series of color transformation operations can be accessed and private tags through which an alternative series of color transformation operations can be accessed, said apparatus comprising:

inputting means for inputting the color image data;

a memory for storing a first private tag and a second private tag, the first private tag for storing override information for overriding the unalterable series of color transformation operations, and the second private tag for storing, in a hierarchical storage structure, tag element data and references to public tags and other private tags in the device profile; and a processing means for (1) determining, based on the override information in the first private tag, whether to access the second private tag, (2) reading data from the second private tag in a case that said processing means determines to access the second private tag, the processing means following pointers within the hierarchical storage structure to access the tag element data and the public tags and other private tags referenced in the second private tags and (3) performing color transformation operations on the color image data using the data read from the second private tag.

2. An apparatus according to claim 1, wherein the references to public tags and other private tags in the second private tag define a color transformation sequence which corresponds to an order of color transformation operations to be performed on the color image data.

3. An apparatus according to claim 2, where the color transformation sequence includes pointers to the color transformation operations, and wherein said processing means accesses the color transformation operations based on the pointers included in the color transformation sequence.

4. An apparatus according to claim 1, wherein said memory stores a list of color transformation operations, and wherein said processing means accesses a color transformation operation in the list of color transformation operations based on the data read from the second private tag.

5. An apparatus according to claim 1, wherein in a case that said processing means determines not to access the second private tag, the input color image data is processed in accordance with the series of color transformation operations stored in the public tags.

6. A method for converting input color image data between a device-dependent color space and a device-independent color space using a device profile having public tags through which an unalterable series of color transformation operations can be accessed, and private tags through which an alternative series of color transformation operations can be accessed, said method comprising:

an inputting step for inputting the color image data;

a storing step for storing a first private tag and a second private tag, the first private tag for storing override information for overriding the unalterable series of color transformation operations, and the second private tag for storing, in a hierarchical storage structure, tag element data and references to public tags and other private tags in the device profile;

a determining step for determining, based on the override information in the first private tag, whether to access the second private tag;

a reading step for reading data from the second private tag in a case that said determining step determines to access the second private tag, said reading step following pointers within the hierarchical storage structure to access the tag element data and the public tags and other private tags referenced in the second private tag; and a processing step for performing color transformation operations on the color image data using the data read from the second private tag.

7. A method according to claim 6, wherein the references to public tags and other private tags in the second private tag define a color transformation sequence which corresponds to an order of color transformation operations to be performed on the color image data.

8. A method according to claim 7, wherein the color transformation sequence includes pointers to the color transformation operations, and wherein said reading step accesses the color transformation operations based on the pointers included in the color transformation sequence.

9. A method according to claim 6, wherein said storing step stores a list of color transformation operations, and wherein said processing step accesses a color transformation operation in the list of color transformation operations based on the data read from the second private tag.

10. A method according to claim 6, wherein in a case that said determining step determines not to access the second private tag, the input color image data is processed in accordance with the series of color transformation operations stored in the public tags.

11. Computer-executable process steps stored on a computer-usable storage medium, said process steps being used to convert input color image data between a device-dependent color space and a device-independent color space using a device profile having both public tags through which an unalterable series of color transformation operations can be accessed and private tags through which an alternative series of color transformation operations can be accessed, said process steps comprising:

an inputting step to input the color image data;

a storing step to store a first private tag and a second private tag, the first private tag for storing override information for overriding the unalterable series of color transformation operations, and the second private tag for storing, in a hierarchical storage structure, tag element data and references to public tags and other private tags in the device profile;

a determining step to determine, based on the override information in the first private tag, whether to access the second private tag;

a reading step to read data from the second private tag in a case that said determining step determines to access the second private tag, said reading step following pointers within the hierarchical storage structure to access the tag element data and the public tags and other private tags referenced in the second private tag; and a processing step to perform color transformation operations on the color image data using the data read from the second private tag.

12. Computer-executable process steps according to claim 11, wherein the references to public tags and other private tags in the second private tag define a color transformation sequence which corresponds to an order of color transformation operations to be performed on the color image data.

13. Computer-executable process steps according to claim 12, wherein the color transformation sequence includes pointers to the color transformation operations, and wherein said processing step accesses the color transformation operations based on the pointers included in the color transformation sequence.

14. Computer-executable process steps according to claim 11, wherein said storing step stores a list of color transformation operations, and wherein said processing step accesses a color transformation operation in the list of color transformation operations based on the data read from the second private tag.

15. Computer-executable process steps according to claim 11, wherein in a case that said determining step determines not to access the second private tag, the input color image data is processed in accordance with the series of color transformation operations stored in the public tags.

16. An apparatus which uses user-definable private tags to alter a predetermined color transformation sequence defined in a standard device profile by unalterable public tags, said apparatus comprising:

an inputting means for inputting color image data;

a memory for storing a device profile which includes plural public tags and at least (1) proprietary header information, (2) a first private tag which includes override information, and (3) a second private tag which includes a color transformation sequence defined by tag element data and references to other tags in the device profile; and a processing means for (1) determining whether to access the first private tag based on the proprietary header information in the device profile, (2) reading, in the case that the first private tag is to be accessed, the override information in the first private tag and determining whether to access the second private tag based on the override information, (3) reading, in the case that the second private tag is to be accessed, the tag element data and references to other tags in the second private tag and determining whether and in what order to access public and other private tags in the device profile based on the references to other tags in the second private tag, and (4) transforming the input color image data from one color space to another color space using the tag element data and the references to other tags read from the second private tag.

17. An apparatus according to claim 16, wherein the public and other private tags in the device profile each define a color transformation operation, and wherein the second private tag includes the public and other private tags in the color transformation sequence.

18. An apparatus according to claim 17, wherein said memory stores a third private tag which defines a look-up table for transforming color image data between two color spaces; and wherein the second private tag includes a reference to the third private tag, by which the processing means accesses the third private tag in order to transform the input color image data from one color space to another color space.

19. An apparatus according to claim 16, wherein the proprietary header information comprises CMM data, and wherein the processing means determines whether to access the first private tag by reading the CMM data in the header of the device profile and by searching the first private tag for data corresponding to the CMM data.

20. An apparatus according to claim 16, wherein the first and second private tags are created by a user, and wherein said processing means executes an interactive routine by which private tags are created in accordance with a user's input.

21. An apparatus according to claim 16, wherein said processing means determines which color transformation operation to perform by matching data read from the second private tag to a pre-stored list of color transformation operations.

22. A method which uses user-definable private tags to alter a predetermined color transformation sequence defined in a standard device profile by unalterable public tags, said method comprising:

an inputting step for inputting color image data;

a storing step for storing a device profile which includes plural public tags and at least (1)proprietary header information, (2) a first private tag which includes override information, and (3) a second private tag which includes a color transformation sequence defined by tag element data and references to other tags in the device profile;

a determining step for determining whether to access the first private tag based on the proprietary header information in the device profile;

a first reading step for reading, in the case that the first private tag is to be accessed, the override information in the first private tag and determining whether to access the second private tag based on the override information;

a second reading step for reading, in the case that the second private tag is to be accessed, the tag element data and references to other tags in the second private tag and determining whether and in what order to access public and other private tags in the device profile based on the references to other tags in the second private tag; and a transforming step for transforming the input color image data from one color space to another color space using the tag element data and the references to other tags read from the second private tag.

23. A method according to claim 22, wherein the public and other private tags in the device profile each define a color transformation operation, and wherein the second private tag includes the public and other private tags in the color transformation sequence.

24. A method according to claim 23, wherein said storing step further comprises storing a third private tag, which includes table data for transforming color image data between two color spaces; and wherein the second private tag includes a reference to the third private tag by which the transforming step accesses the third private tag in order to transform the input color image data from one color space to another color space.

25. A method according to claim 22, wherein the proprietary header information comprises CMM data, and wherein the determining step determines whether to access the first private tag by reading the CMM data in the header of the device profile and by searching the first private tag for data corresponding to the CMM data.

26. A method according to claim 22, wherein said transforming step determines which color transformation operation to perform by matching data read in said second reading step to a pre-stored list of color transformation operations.

27. Computer-executable process steps stored on a computer-readable medium which use user-definable private tags to alter a predetermined color transformation sequence defined in a standardized device profile by unalterable public tags, said process steps comprising:

an inputting step to input color image data;

a storing step to store a device profile which includes plural public tags and at least (1) proprietary header information, (2) a first private tag which includes override information, and (3) a second private tag which includes a color transformation sequence defined by tag element data and references to other tags in the device profile;

a determining step to determine whether to access the first private tag based on the proprietary header information in the device profile;

a first reading step to read, in the case that the first private tag is to be accessed, the override information in the first private tag and to determine whether to access the second private tag based on the override information;

a second reading step to read, in the case that the second private tag is to be accessed, the second tag element data and references to other tags in the second private tag and to determine whether and in what order to access public and other private tags in the device profile based on the references to other tags in the second private tag; and a transforming step to transform the input color image data from one color space to another color space using the tag element data and the references to other tags read from the second private tag.

28. Computer-executable process steps according to claim 27, wherein the public and other private tags in the device profile each define a color transformation operation, and wherein the second private tag includes the public and other private tags in the color transformation sequence.

29. Computer-executable process steps according to claim 28, wherein said computer-executable process steps further comprise a storing step to store a third private tag which includes table data to transform color image data between two color spaces; and wherein the second private tag includes a reference to a third private tag by which the transforming step accesses the third private tag to transform the input color image data from one color space to another color space.

30. Computer-executable process steps according to claim 27, wherein the proprietary header information comprises CMM data, and wherein the determining step determines whether to access the first private tag by reading the CMM data in the header of the device profile and by searching the first private tag for data corresponding to the CMM data.

31. Computer-executable process steps according to claim 27, wherein said transforming step determines which color transformation operation to perform by matching data read in said second reading step to a pre-stored list of color transformation operations.

32. An apparatus for (1) adding private tags to a predefined device profile which includes proprietary header information, the private tags being used to modify a color transformation sequence defined by unalterable public tags in the device profile, and (2) transforming color image data between different color spaces using the modified color transformation sequence, said apparatus comprising:

inputting means for inputting the color image data, override information, tag element data, and references to other tags in the device profile, the tag element data including predefined data used in color transformation operations;

storing means for storing the override information in a first private tag in the device profile, and for storing the tag element data and references to other tags in the device profile in a second private tag in the device profile; and a processing means for (1) determining whether to access the first private tag based on the proprietary header information in the device profile, (2) reading, in the case that the first private tag is to be accessed, the override information in the first private tag and determining whether to access the second private tag based on the override information, (3) reading, in the case that the second private tag is to be accessed, the tag element data and references to other tags in the second private tag and determining whether and in what order to access public and other private tags in the device profile based on the references to other tags in the second private tag, and (4) transforming the input color image data from one color space to another color space using the tag element data and the references to other tags read from the second private tag.

33. A method of (1) adding private tags to a predefined device profile which includes proprietary header information, the private tags being used to modify a color transformation sequence defined by unalterable public tags in the device profile, and (2) transforming color image data between different color spaces using the modified color transformation sequence, said method comprising:

an inputting step for inputting the color image data, override information, tag element data, and references to other tags in the device profile, the tag element data including predefined data used in color transformation operations;

a storing step for storing the override information in a first private tag in the device profile, and for storing the tag element data and references to other tags in the device profile in a second private tag in the device profile; and a processing step for (1) determining whether to access the first private tag based on the proprietary header information in the device profile, (2) reading, in the case that the first private tag is to be accessed, the override information in the first private tag and determining whether to access the second private tag based on the override information, (3) reading, in the case that the second private tag is to be accessed, the tag element data and references to other tags in the second private tag and determining whether and in what order to access public and other private tags in the device profile based on the references to other tags in the second private tag, and (4) transforming the input color image data from one color space to another color space using the tag element data and the references to other tags read from the second private tag.

34. Computer-executable process steps stored in a computer-readable storage medium, said process steps (1) to add private tags to a predefined device profile which includes proprietary header information and (2) to transform color image data between different color spaces using the modified color transformation sequence, said process steps comprising:

an inputting step to input the color image data, override information, tag element data, and references to other tags in the device profile, the tag element data including predefined data used in color transformation operations;

a storing step to store the override information in a first private tag in the device profile, and to store the tag element data and references to other tags in the device profile in a second private tag in the device profile; and a processing step to (1) determine whether to access the first private tag based on the proprietary header information in the device profile, (2) read, in the case that the first private tag is to be accessed, the override information in the first private tag and determine whether to access the second private tag based on the override information, (3) read, in the case that the second private tag is to be accessed, the tag element data and references to other tags in the second private tag and determine whether and in what order to access public and other private tags in the device profile based on the references to other tags in the second private tag, and (4) transform the input color image data from one color space to another color space using the tag element data and the references to other tags read from the second private tag.

* * * * *

UNITED STATES PATENT AND TRADEMARK OFFICE
CERTIFICATE OF CORRECTION

PATENT NO. : 5,646,752

DATED : July 8, 1997

INVENTORS : Timothy L. Kohler, Jonathan Y. Hui

Page 1 of 3

It is certified that error appears in the above-identified patent and that said Letters Patent is hereby corrected as shown below:

COVER PAGE

Under [56] References Cited, the following additional art should be listed:

| | | | |
|---|---|---|---|
| 5,200,816 | 4/1993 | Rose | 358/80 |
| 5,239,370 | 8/1993 | Yamaguchi | 358/518 |
| 5,257,097 | 10/1993 | Pineau et al. | 358/500 |
| 5,309,257 | 5/1994 | Bonino et al. | 358/504 |
| 5,315,415 | 5/1994 | Kawai et al. | 358/515 |
| 5,349,452 | 9/1994 | Maeda et al. | 358/527 |
| 5,414,529 | 5/1995 | Terada et al. | 358/448 |

OTHER DOCUMENTS

International Color Consortium Profile Format, Version 3.01 (Revised May 8, 1995)

Fraser, Bruce, "Color management is coming of age -- at last", Adobe Magazine, pp. 41-45 (September/October 1995)

COLUMN 4

Line 55, change "Canone" to --Canon®--.

UNITED STATES PATENT AND TRADEMARK OFFICE
CERTIFICATE OF CORRECTION

PATENT NO. : 5,646,752

DATED : July 8, 1997

INVENTORS : Timothy L. Kohler, Jonathan Y. Hui

It is certified that error appears in the above-identified patent and that said Letters Patent is hereby corrected as shown below:

COLUMN 6

Line 14, delete "a" (third occurrence).

COLUMN 7

Line 20, change "c," to --C,--; and
Line 24, change "LOTs" to --LUTs--.

COLUMN 8

Line 60, change "CSZ Signature," to --CS2Signature,--.

COLUMN 9

Line 2, change "(Tallgent)" to --(Taligent)--; and
Line 16, change "ASCIi" to --ASCII--.

UNITED STATES PATENT AND TRADEMARK OFFICE
CERTIFICATE OF CORRECTION

PATENT NO. : 5,646,752

DATED : July 8, 1997

INVENTORS : Timothy L. Kohler, Jonathan Y. Hui

It is certified that error appears in the above-identified patent and that said Letters Patent is hereby corrected as shown below:

COLUMN 12

```
Line 60, change "AtoBOTag" to    --AtoB0Tag--
Line 62, change "BOTag" to    --B0Tag--;
Line 63, change "AtoBOTag" to    --AtoB0Tag--
Line 64, change "AtoBOTag" to     --AtoB0Tag--
```

COLUMN 20

```
Line 60, change "tags" to --tag--.
```

Signed and Sealed this

Twenty-fourth Day of March, 1998

Attest:

BRUCE LEHMAN

*Attesting Officer*  Commissioner of Patents and Trademarks